US011099026B2

(12) United States Patent
Lee

(10) Patent No.: US 11,099,026 B2
(45) Date of Patent: Aug. 24, 2021

(54) CONTENT VISUALIZING METHOD AND APPARATUS

(71) Applicant: Samsung Electronics Co., Ltd., Suwon-si (KR)

(72) Inventor: Hee Sae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 16/362,735

(22) Filed: Mar. 25, 2019

(65) Prior Publication Data
US 2020/0116518 A1 Apr. 16, 2020

(30) Foreign Application Priority Data
Oct. 15, 2018 (KR) .................. 10-2018-0122382

(51) Int. Cl.
G01C 21/36 (2006.01)
G01C 21/34 (2006.01)
G06F 3/01 (2006.01)
G06K 9/00 (2006.01)

(52) U.S. Cl.
CPC ....... G01C 21/365 (2013.01); G01C 21/3415 (2013.01); G01C 21/3638 (2013.01); G06F 3/013 (2013.01); G06K 9/00791 (2013.01)

(58) Field of Classification Search
CPC ............. G01C 21/365; G01C 21/3415; G01C 21/3638; G06F 3/013; G06K 9/00791
USPC ........................................................ 701/431
See application file for complete search history.

(56) References Cited

U.S. PATENT DOCUMENTS

| 8,090,533 | B2* | 1/2012 | Koike ............... G01C 21/3682 |
| | | | 701/410 |
| 9,171,214 | B2 | 10/2015 | Ben Tzvi |
| 9,625,264 | B1 | 4/2017 | Imanishi et al. |
| 2010/0164702 | A1 | 7/2010 | Sasaki et al. |
| 2012/0050144 | A1 | 3/2012 | Morlock |
| 2012/0224060 | A1 | 9/2012 | Gurevich et al. |
| 2013/0289875 | A1* | 10/2013 | Kumon .................. G01C 21/36 |
| | | | 701/533 |
| 2016/0327402 | A1 | 11/2016 | Funabiki et al. |
| 2018/0089899 | A1 | 3/2018 | Piemonte et al. |

FOREIGN PATENT DOCUMENTS

| JP | 2016-74410 A | 5/2016 |
| JP | 2016-182891 A | 10/2016 |
| KR | 10-2013-0027367 A | 3/2013 |
| KR | 10-2013-0067888 A | 6/2013 |
| KR | 10-2015-0054022 A | 5/2015 |
| KR | 10-2017-0029071 A | 3/2017 |

(Continued)

OTHER PUBLICATIONS

Extended European Search Report dated Nov. 8, 2019 in counterpart European Application No. 19168983.5 (14 pages in English).

Primary Examiner — Gertrude Arthur Jeanglaude
(74) Attorney, Agent, or Firm — NSIP Law

(57) ABSTRACT

Provided is a content visualizing method and apparatus. The content visualizing apparatus generates an object disposition space based on a road surface and an obstacle and determines a display position at which a graphic representation corresponding to route guidance content is visualized in the object disposition space.

36 Claims, 24 Drawing Sheets

(56) References Cited

FOREIGN PATENT DOCUMENTS

| | | |
|---|---|---|
| KR | 10-2017-0133747 A | 12/2017 |
| KR | 10-2018-0050811 A | 5/2018 |
| WO | WO 2018/145958 A1 | 8/2018 |

\* cited by examiner

FIG. 21
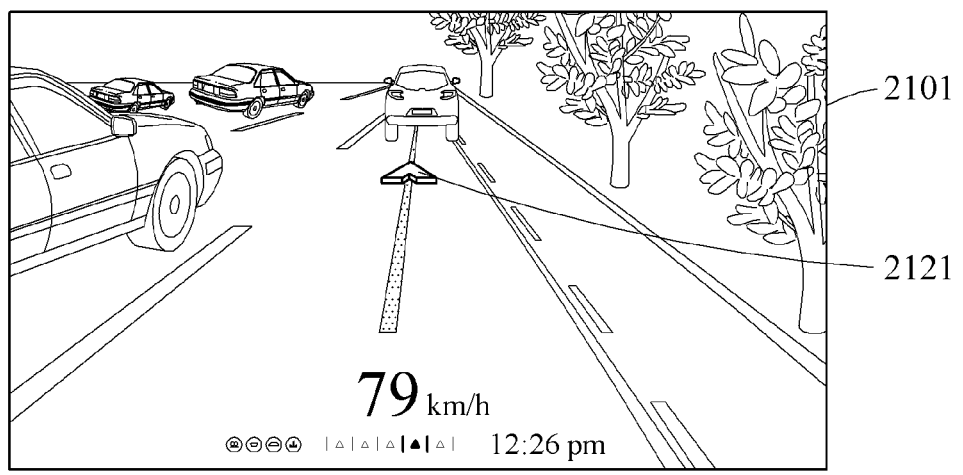
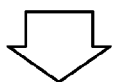
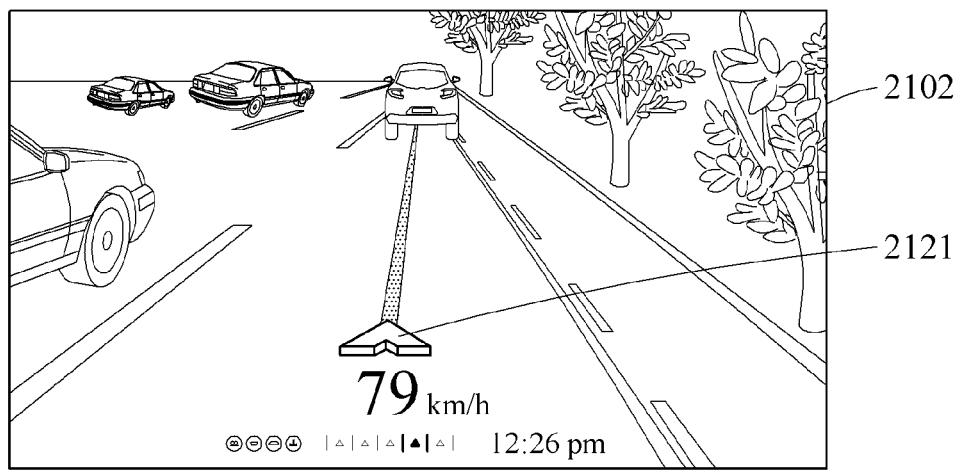

CONTENT VISUALIZING METHOD AND APPARATUS

CROSS-REFERENCE TO RELATED APPLICATIONS

This application claims the benefit under 35 USC § 119(a) of Korean Patent Application No. 10-2018-0122382 filed on Oct. 15, 2018 in the Korean Intellectual Property Office, the entire disclosure of which is incorporated herein by reference for all purposes.

BACKGROUND

1. Field

The following description relates to technology that visualizes content.

2. Description of Related Art

To assist in driving, augmented reality (AR) representing a variety of visual information is provided through displays or navigation systems mounted on a vehicle and other means of transportation. For example, efforts have been made to display driving information through an AR-based head-up display (HUD).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a content visualizing method, including generating a three-dimensional (3D) object disposition space based on a road region ahead, determining a display position for route guidance content based on an indication point of the route guidance content and the 3D object disposition space, and three-dimensionally visualizing a graphic object corresponding to the route guidance content at the determined display position.

The indication point may include a point where an operation corresponding to the route guidance content is performed.

The generating may include generating the 3D object disposition space based on a field of view (FOV) of a user and a distance from a viewpoint of the user to an obstacle.

The three-dimensionally visualizing may include generating a first graphic representation corresponding to a left eye of a user and a second graphic representation corresponding to a right eye of the user, and providing a disparity between the first graphic representation and the second graphic representation.

The providing may include tracking positions of the left eye and the right eye of the user.

The determining may include determining a position in the 3D object disposition space to be the display position, in response to the indication point being out of the 3D object disposition space.

A position corresponding to the indication point may be located substantially close to a limiting plane of the object disposition space, and on an axis from a center of an eye box of the user toward the point.

The determining may include fitting a height of the display position to a bottom of the 3D object disposition space, in response to a height of the indication point being lower than the bottom of the 3D object disposition space.

The determining may include fitting a height of the display position to a bottom of the 3D object disposition space, in response to a road surface not intersecting a space corresponding to a view of a user.

The determining may include updating the display position to be within the 3D object disposition space, in response to a distance from a user to the display position being greater than a maximum distance of the 3D object disposition space.

The generating may include generating the 3D object disposition space based on a field of view (FOV) of a user and a body of a vehicle on which a content visualizing apparatus is mounted.

The three-dimensionally visualizing may include determining a content movement trajectory based on a field of view (FOV) of a user and a body of a vehicle, and visualizing the graphic object by adjusting a height of the graphic object based on the content movement trajectory, in response to a content visualizing apparatus approaching the indication point.

The content visualizing method may include restricting the 3D object disposition space, in response to the 3D object disposition space intersecting a road surface.

A bottom of the 3D object disposition space may be fitted to a surface of a road region estimated in a vicinity of a vehicle.

The generating of the 3D object disposition space may include fitting the bottom of the 3D object disposition space to the road surface to a maximum distance from an intersections of the road surface and a space corresponding to a field of view (FOV) of a user.

The three-dimensionally visualizing may include visualizing a shadow object in a region under the graphic object in the 3D object disposition space.

The visualizing of the shadow object may include maintaining a brightness of a shadow region under the graphic object with respect to a region around the shadow region, and visualizing the graphic object at a brightness higher than that of the shadow region.

The content visualizing method may include determining a subsequent display position for subsequent route guidance content, in response to a content visualizing apparatus reaching the display point for the route guidance content, and visualizing another graphic object corresponding to the subsequent route guidance content at the subsequent display position.

The three-dimensionally visualizing may include determining a transparency of the graphic object based on a distance from a maximum distance of the 3D object disposition space to the graphic object.

The content visualizing method may include increasing a transparency of the route guidance content that is located proximal to a boundary of the 3D object disposition space.

The route guidance content may include a plurality of point objects disposed along a line, wherein the plurality of point objects are spaced apart from each other at a unit interval.

The determining may include obtaining temporary guidance content corresponding to the display position, in response to the indication point differing from the display position, wherein the three-dimensionally visualizing may include visualizing a graphic object corresponding to the temporary guidance content at the display position until the 3D object disposition space includes the indication point.

The content visualizing method may include visualizing a graphic object corresponding to information related to a lane on which a content visualizing apparatus is travelling, and a graphic object corresponding to a dangerous object on a road on which the content visualizing apparatus is positioned.

The three-dimensionally visualizing may include visualizing the graphic object while gradually moving the graphic object from a previous display position to a new display position, in response to the display position being changed while the graphic object is visualized.

In another general aspect, there is provided a content visualizing apparatus, including a processor configured to generate a three-dimensional (3D) object disposition space based on a road region ahead, and to determine a display position based on an indication point of route guidance content and the 3D object disposition space, and a display configured to three-dimensionally visualize a graphic object corresponding to the route guidance content at the determined display position.

The content visualizing apparatus may include a memory configured to store the route guidance content, the information related to the state of a device, map database, and instructions that, when executed, configures the processor to determine any one or any combination of the 3D object disposition space and the display position.

The processor may be configured to determine the indication point based on road information in the map database.

The content visualizing apparatus may include a sensor, disposed on a device, and being configured to sense information related to a state of the device, and a distance from an obstacle in a vicinity of the device, and to track positions of a left eye and a right eye of a user, in response to the vehicle being in motion, and the processor may be configured to generate a first graphic representation corresponding to the position of the left eye of the user, generate a second graphic representation corresponding to the position of the right eye of the user, and render the 3D graphic object on the HUD based on a disparity between the first graphic representation and the second graphic representation.

The device may include a vehicle, and the information related to the state of the device may include any one or any combination of position information of the vehicle, current geographical coordinates of the vehicle, road information corresponding to a position of the vehicle, lane on which the vehicle is travelling, width of the lane on which the vehicle is travelling, width of a road on which the vehicle is travelling, a number of lanes of the road, a center line of the lane, turn points on the road, traffic signals on the road, a speed of the vehicle, fuel of the vehicle, fuel level of the vehicle, and maintenance information of the vehicle.

The object disposition space may include a rectangular cone-shaped area extending from both eyes of a user to a road region in front of the device.

Other features and aspects will be apparent from the following detailed description, the drawings, and the claims.

BRIEF DESCRIPTION OF THE DRAWINGS

FIG. 21 illustrates an example of statically visualizing route guidance content.

Figure 1:
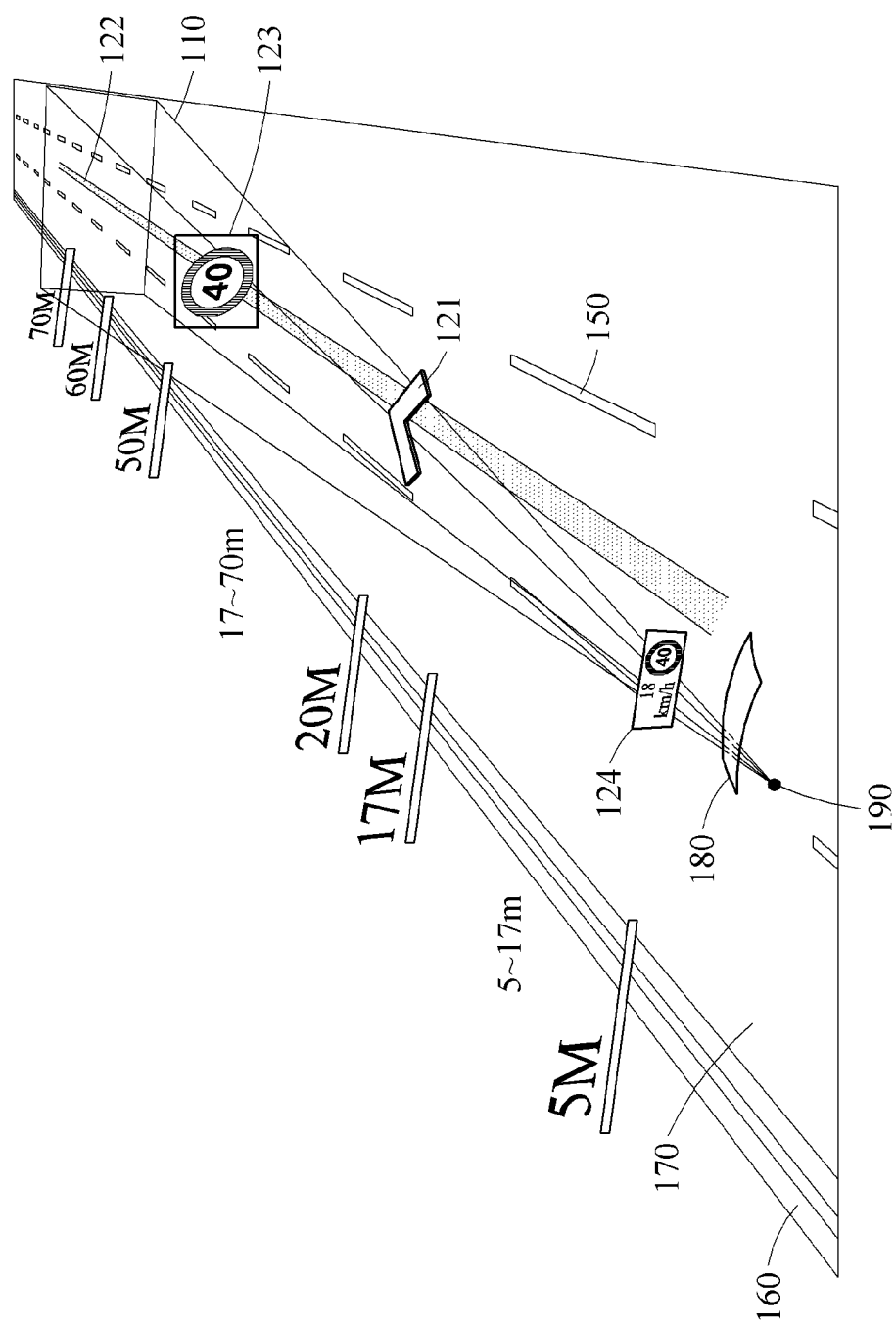
FIG. 1 illustrates an example of visualized content.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The use of the term 'may' herein with respect to an example or embodiment, e.g., as to what an example or embodiment may include or implement, means that at least one example or embodiment exists where such a feature is included or implemented while all examples and embodiments are not limited thereto.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 illustrates an example of visualized content.

A content visualizing apparatus visualizes a graphic object corresponding to route guidance content 121. The content visualizing apparatus disposes and visualizes the graphic object at a position in an object disposition space 110. In an example, the content visualizing apparatus stereoscopically provides the graphic object by presenting a left image and a right image to a left eye and a right eye of a user, respectively. In an example, the left image and the right image include graphic objects spaced apart from each other by a distance corresponding to a disparity in depth along a horizontal axis. Thus, the user recognizes a depth of a stereoscopically rendered graphic object.

In an example, the object disposition space 110 is a three-dimensional (3D) space where the graphic object is to be disposed. In an example, the object disposition space 110 is a space in which a graphic object having a depth is stereoscopically visualized. Coordinates of each point belonging to the object disposition space 110 are mapped in a scale identical or similar to that of geographic coordinates of a physical world. In an example, a boundary of the object disposition space 110 is determined based on a structure of a head-up display (HUD). The content visualizing apparatus visualizes the graphic object in a space between a minimum depth, for example, a minimum distance, to a maximum depth, for example, a maximum distance, wherein the minimum depth and the maximum depth are determined based on the structure of the HUD. In the example of FIG. 1, the minimum distance is 5 meters (m), and the maximum distance is 70 m. However, examples are not limited thereto and other distances may be used without departing from the spirit and scope of the illustrative examples described.

In an example, the object disposition space 110 is determined based on a space corresponding to a view of the user. A shape and a size of the object disposition space 110 are determined based on a size of an eye box 190 and an field of view (FOV) provided by the HUD. The object disposition space 110 is a space provided in a shape of a rectangular cone which extends from the eye box 190 to correspond to the FOV. The eye box 190 is a region set such that both eyes of the user are may be positioned in the eye box 190.

In an example, the content visualizing apparatus is implemented to visualize various types of graphic representations at display positions in the object disposition space 110 over a windshield 180, and to visualize different types of graphic representations in different object disposition spaces 110.

The types of graphic representations to be displayed in the object disposition space 110 include, for example, the route guidance content 121, a path indicating line 122, warning content 123, and driving related content 124. The types of graphic representations to be displayed in the object disposition space 110 may be modified, and other types of graphic representations such as, for example, road obstacle, road condition may be used without departing from the spirit and scope of the illustrative examples described.

The user recognizes the corresponding graphic representations as being present at physical positions corresponding to the display positions in the object disposition space 110. As described above, in an example, every coordinate in the object disposition space 110 is mapped to a single physical coordinate.

Herein, a display position refers to a point at which a graphic object is to be displayed, for example, a point in a 3D space. The display position has absolute 3D coordinates or 3D coordinates relative to a vehicle. The display position is fixed or moved depending on an operation of the content visualizing apparatus.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility device, or a drone. In an example, the smart mobility device includes mobility devices such as, for example, electric wheels, electric kickboard, and electric bike. In an example, vehicles include motorized and nonmotorized vehicles, for example, a vehicle with a power engine (for example, a cultivator or a motorcycle), a bicycle or a handcart.

In addition to the vehicle described herein, methods and apparatuses described herein may be included in various other devices, such as, for example, a smart phone, a walking assistance device, a wearable device, a security device, a robot, a mobile terminal, and various Internet of Things (IoT) devices.

The term "road" is a thoroughfare, route, or connection, between two places that has been improved to allow travel by foot or some form of conveyance, such as a vehicle. A road can include various types of roads refers to a way on which vehicles drive, and includes various types of roads such as, for example, a highway, a national road, a local road, an expressway, farm roads, local roads, high-speed national roads, and a motorway.

The term "lane" refers to a road space distinguished by lane boundaries marked on a surface of the road. The term "current driving lane" refers to a lane in which the vehicle is currently driving and indicates a lane space currently occupied and used by the vehicle. The current driving lane is also referred to as an "ego lane". The term "lane boundary" refers to a solid line of or a broken line marked on the surface of the road to distinguish the lane. In this disclosure, the term "lane boundary" is interchangeably used with the term "lane marking".

The methods and apparatuses are used to road guidance information in a navigation device of a vehicle, such as, for example, an augmented reality head-up display (AR 3D HUD), and an autonomous vehicle. In an example, the methods and apparatuses described herein may be used to generate information to support a driver or to control an autonomous vehicle. In an example, the examples described herein may also be used to interpret visual information for an intelligent system installed for fully autonomous driving or driving assistance in a vehicle, and used to assist safe and comfortable driving. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling, a smartphone, or a mobile device. The examples related to displaying a road guidance information for vehicles is provided as an example only, and other examples such as, for example, training, gaming, applications in healthcare, public safety, tourism, and marketing are considered to be well within the scope of the present disclosure.

Route guidance information is information which guides the user to travel based on a route. In an example, the route is set by the user. The route guidance information includes a distance the user needs to go straight, and a turn to make at an intersection. The route is a path that the user needs to go along from a point of departure to reach a destination. The route guidance content 121 is content in which the route guidance information to be provided for travelling along a route to the destination is visualized, and includes, for example, numbers and letters indicating the distance that the user needs to go straight, and arrows indicating turns, for example, a left turn and a right turn, to make at an intersection. The path indicating line 122 is a line indicating a path that is to be travelled to reach a destination, and is visualized as route guidance information in a form different from that of the route guidance content 121. The warning content 123 includes a warning message to be provided to the user, as needed, in a current driving environment.

The driving related content 124 is content related to driving. The driving related content 124 is information related to, for example, a speed, an acceleration, a position, fuel, and maintenance of a vehicle. The information related to fuel indicates a residual amount of gasoline of a gasoline vehicle, a residual amount of diesel of a diesel vehicle, a residual amount of hydrogen of a hydrogen vehicle, or an amount of charged power of an electric vehicle. The information related to the maintenance indicates information to be used to determine whether the maintenance of a vehicle is needed, such as for example, a condition of engine oil, a condition of transmission fluid, a cumulative travel distance, and a tire pressure. However, examples are not limited thereto, and other types and forms of driving related content are considered to be well within the scope of the present disclosure.

The content visualizing apparatus visualizes the route guidance content 121 and the path indicating line 122 at positions apart from the user. For reference, when the content visualizing apparatus is mounted on a vehicle, the user is a driver of the vehicle.

A driver who drives a vehicle on which the content visualizing apparatus is mounted is likely to gaze principally at a position far away from the vehicle on a road 170. The content visualizing apparatus visualizes content such as the route guidance content 121 or the path indicating line 122 at a position far away from the vehicle, thereby alleviating a visual fatigue of the user. That is, by visualizing a graphic object indicating a route at a distance corresponding to a depth similar to a depth at which the user gazes, the content visualizing apparatus reduces a crosstalk caused by a depth confusion of the user.

The content visualizing apparatus estimates the position of the vehicle using sensors, such as, for example, a camera sensor, a global positioning system (GPS), and a light detection and ranging (LIDAR). The content visualizing apparatus visualizes the graphic object corresponding to the route guidance content 121 to be matched to a real road, in view of an error distance from the position of the vehicle to the positions of the eyes of the driver. The device for visualizing the contents can visualize the graphic object corresponding to the route guidance content 121 on the actual road by considering the error interval as much as the driver's eye position from the position of the vehicle. When high definition (HD) map data is used, the content visualizing apparatus matches the route guidance content 121 to a more accurate position. Through such matching, the content visualizing apparatus improves a psychological stability of the driver.

Driving related content 124 associated with general information to be provided to the driver in a normal driving circumstance is visualized at a first position apart from the user by a distance, for example, a relatively close position. When it is determined that an alarm needs to be provided to the driver, the content visualizing apparatus provides an alarm to the user by visualizing a portion or an entirety of the driving related content 124 at a position farther than the first position. The speed of the vehicle is visualized in a form of the warning content 123 at a position about 50 m ahead. When the situation requiring an alarm is resolved, the content visualizing apparatus moves the portion or the entirety of the driving related content 124 back to the first position.

Unlike the route guidance content 121 that the user frequently gazes at while driving, the user gazes at the driving related content 124 only when the user needs to do. Since the user gazes at the driving related content 124 with a relatively low frequency, there is a relatively low probability of the driving related content 124 causing a crosstalk even when the driving related content 124 is visualized at a relatively close position. To secure a view for driving, the driving related content 124 is visualized at a corner, for example, a lower end portion, of the object disposition space 110. In the example of FIG. 1, the relatively close position ranges from 5 m to 17 m, and the relatively far position ranges from 17 m to 70 m. However, examples are not limited thereto.

For reference, as shown in FIG. 1, the road 170 includes at least one lane. A lane line 150 is a boundary line which separates a lane from another lane. However, examples are not limited to a case in which the lane line 150 exists on the road 170 or a lane. A center line 160 refers to a boundary line indicating that the vehicle is prohibited from crossing the line.

Figure 2:
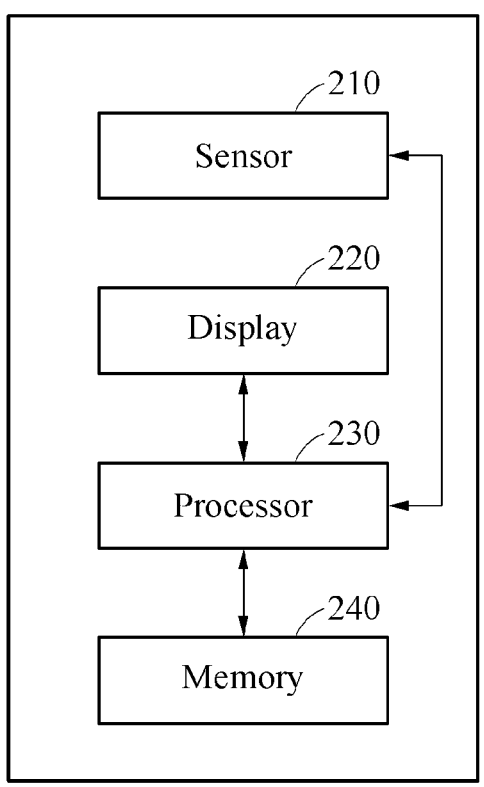
FIG. 2 illustrates an example of a configuration of a content visualizing apparatus.

FIG. 2 illustrates an example of a configuration of a content visualizing apparatus. Referring to FIG. 2, a content visualizing apparatus 200 includes a sensor 210, a display 220, a processor 230, and a memory 240.

The sensor 210 senses information to visualize the content. The sensor 210 measures a distance to an object positioned in a vicinity of a user, and includes sensors, such as, for example, a LIDAR and a radio detection and ranging (RADAR). In an example, the sensor 210 senses information related to a state of a device on which the content visualizing apparatus 200 is mounted. When the content visualizing apparatus 200 is mounted on a vehicle, the sensor 210 senses information related to the vehicle, such as, for example, position information of the vehicle, road information corresponding to a position of the vehicle, and driving related information of the vehicle. In an example, the driving related information is information such as, for example, information related to driving of the vehicle, and includes, for example, information related to a speed, an acceleration, a position, fuel, and maintenance of the vehicle. The sensor 210 includes an internal sensor which captures an inside of the vehicle. The internal sensor includes a camera sensor, for example, a color camera, an infrared sensor, a depth sensor, and a thermal imaging camera. However, examples are not limited thereto, and other sensors 210 may be used without departing from the spirit and scope of the illustrative examples described.

In an example, the position information of the vehicle indicates current coordinates at which the vehicle is positioned, and a lane on which the vehicle is currently travelling. In an example, the sensor 210 obtains two-dimensional (2D) coordinates of the vehicle through a GPS. In an example, the sensor 210 acquires a front-view image of a view in front of the vehicle, and the processor 230 determines a lane on which the vehicle is currently travelling, for example, an ego lane, from among a plurality of lanes of a road from the front-view image. However, the examples are not limited thereto. The processor 230 estimates a current position of the vehicle based on images collected from the sensor 210.

The term "processor," as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA). The processor 230 executes a program and controls the content visualizing apparatus 200. Codes of the program executed by the processor 230 are stored in the memory 240. Further description of the processor 230 is provided below.

The road information includes any one or any combination of a width of a road, the number of lanes of the road, a width of each lane, a center line, a turn point, a traffic signal, and other traffic related information.

The display 220 visualizes content and provides the content to the user. In an example, the display 220 is a physical structure that includes one or more hardware components that provide the ability to render a user interface and/or receive user input. In an example, the content is displayed on a wind shield glass or a separate screen of the vehicle using a head-up display (HUD) device or is displayed on an augmented reality head-up display (AR HUD). In an example, the HUD forms a projection plane in front of the user and provides the content to the user through the projection plane. The display 220 provides a left image to a left eye of the user and a right image to a right eye of the user. The processor 230 generates the left image including a first graphic representation corresponding to a left eye of a driver and the right image including a second graphic representation corresponding to a right eye of the driver. In an example, the display 220 provides the left image and the right image so as to have a disparity therebetween. The display 220 visualizes content having a depth as a stereoscopic graphic object and provides the content to the user by spacing a content-visualized graphic object of the left image and a content-visualized graphic object of the right image from each other based on a binocular disparity. The display 220 visualizes a graphic object corresponding to route guidance content at a display position determined by the processor 230. In an example, the positions of both eyes of the user are measured by the sensor 210, for example, the internal sensor, and provided to the processor 230. The positions of both eyes of the user are tracked all the times while the vehicle is travelling such that the content is stereoscopically delivered even when the driver moves the head up, down, to the right, and to the left or adjusts a height of a seat.

The processor 230 generates or creates, deforms, and adjusts content to be visualized through the display 220. The processor 230 generates an object disposition space based on a road region that is estimated ahead of the vehicle. The processor 230 determines a display position based on an indication point of route guidance content and the object disposition space. The processor 230 fixes the display position, or dynamically adjusts the display position.

The indication point of the route guidance content is a point at which the user needs to perform an operation corresponding to the route guidance content. When the route guidance content is content indicating a turn to make at an intersection, for example, a left turn, the indication point is an entrance point of the intersection at which the user needs to make the turn.

In an example, the processor 230 determines the indication point based on road information included in a map database. The processor 230 determines a turn region in which a turn is to be made based on the route guidance information provided to the vehicle, and determines an entrance point of the turn region to be the indication point. The turn region is a region including a turn point.

However, the operation of the processor 230 is not limited to the example described above. The processor 230 may also perform the above operation along with any one or any combination of operations which will be described below with reference to FIGS. 3 through 24. The operation of the processor 230 will be described further with reference to FIGS. 3 through 24.

The memory 240 temporarily or permanently stores the information to visualize the content. The memory 240 stores instructions to be executed by the processor 230 to perform the operation described with reference to FIGS. 3 through 24. The memory 240 stores the route guidance information, the driving related content, and the map database. The map database is a database storing map data. The map database stores an HD map database. The HD map database includes, for example, information related to fine data such as the number of lanes, a width of each lane, and a position of a center line. Further description of the memory 240 is provided below.

In an example, the content visualizing apparatus 200 is implemented as a 3D HUD for a vehicle, or a navigation system providing a route for the vehicle. In an example, the content visualizing apparatus 200 transmits the content to an electronic control unit (ECU) or a vehicle control unit (VCU) of a vehicle. The ECU or the VCU displays the content on the display 220 of the vehicle. However, the displaying of the content is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the content visualizing apparatus 200 may be used without departing from the spirit and scope of the illustrative examples described.

The content visualizing apparatus 200 is implemented to provide augmented reality (AR) to the user. The content visualizing apparatus 200 displays content to a depth within a range, for example, 5 m to 70 m from the vehicle, beyond a hood of the vehicle. The content visualizing apparatus 200 alleviates a visual fatigue of the user by visualizing the content to a depth similar to a position at which the user is currently gazing, and assists the user to concentrate on driving by visualizing the content to a more accurate depth, which will be described below with reference to FIGS. 3 through 24.

Figure 3:
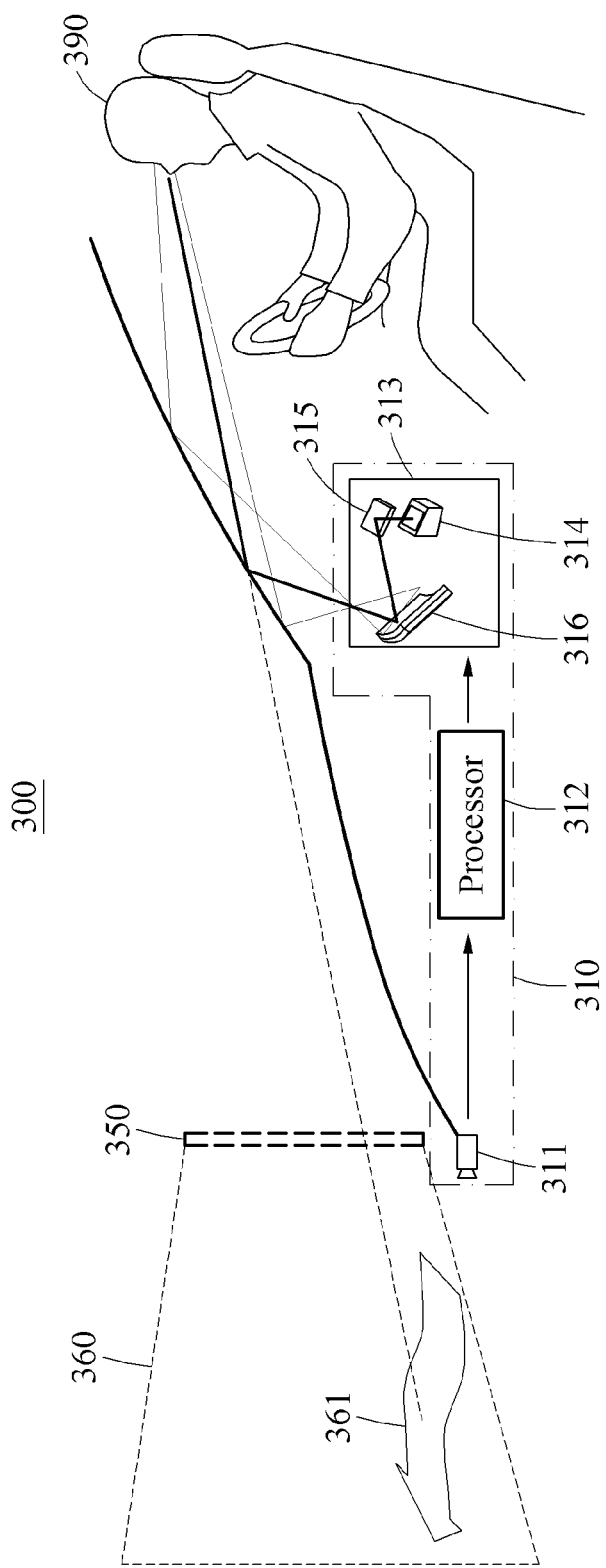
FIG. 3 illustrates an example of a configuration of a head-up display (HUD) of a content visualizing apparatus.

FIG. 3 illustrates an example of a configuration of a HUD of a content visualizing apparatus.

A content visualizing apparatus 300 provides content 361 to a user 390, and is, for example, a device on which a content visualizing apparatus 310 is mounted.

The content visualizing apparatus 310 includes a sensor 311, a processor 312, and a HUD 313.

In an example, the sensor 311 detects an object in front of the content visualizing apparatus 300. The sensor 311 measures a distance to the object in front. However, examples are not limited thereto. The sensor 311 measures a distance to an object in a vicinity of a vehicle, and generates a vicinity distance map indicating the distance to the object in the vicinity of the vehicle. The sensor 311 generates images by capturing environments in front, in rear, on left-hand side, and on right-hand side of the vehicle.

The processor 312 generates the content 361 to be provided to the user 390 based on the detected object. The content 361 is data used to provide information to the user. Information associated with driving, hereinafter, driving information, is information that is needed for driving of the user, such as, for example, route guidance information and driving related information. The processor 312 models the object, detects a position of the object, or recognizes the object by analyzing vicinity information, for example, a distance to an object around and an image including the object, sensed by the sensor 311.

The HUD 313 visualizes the content 361 in a visible region that is positioned in front of the user 390. The HUD 313 visualizes the content 361 on a window disposed in front of the user 390, for example, a windshield of the vehicle. The HUD 313 forms a virtual projection plane 350. The projection plane 350 is a plane on which a virtual image including the content 361 generated by the HUD 313 is displayed. The user 390 recognizes the virtual image as being displayed on the projection plane 350.

The HUD 313 visualizes the content 361 having a depth on the projection plane 350. The processor 312 determines a depth to which the content 361 is to be visualized based on the projection plane 350. In an example, the HUD 313 visualizes, based on the determined depth, the content 361 to have a depth which is relatively far away from or close to the projection plane 350 and the user 390. The HUD 313 visualizes the content 361 having the corresponding depth in a virtual region 360 on the projection plane 350. In an example, the processor 312 renders the content 361 to be a 3D graphic representation based on an optical system of the HUD 313. The 3D graphic representation expresses a stereoscopic graphic representation having a depth, and will be referred to as a graphic object in the following examples. The HUD 313 forms the projection plane 350 including a left image and a right image based on the depth of the content 361, and provides the left image to a left eye of the user 390 and the right image to a right eye of the user 390 through the projection plane 350. Thus, the user 390 recognizes the depth of the stereoscopically rendered content 361.

The HUD 313 includes, for example, a picture generator 314, a fold mirror 315, and a concave mirror 316. However, the configuration of the HUD 313 is not limited thereto, and may include various elements designed to form the projection plane 350 on which a virtual image is focused through projection toward a window disposed in front of the user 390.

Although an example in which the content visualizing apparatus 310 is mounted on a vehicle is described herein, examples are not limited thereto. The content visualizing apparatus 310 may be applied to technology that combines information of a real world and information of a virtual world, such as, for example, AR glasses or mixed reality (MR).

In an example, the content visualizing apparatus 310 continuously expresses the depth by adjusting the depth of the content 361, without changing a position of the projection plane 350 formed by the HUD 313. Since a change of the position of the projection plane 350 is not needed, the content visualizing apparatus 310 does not require a physical control of the elements included in the HUD 313. When the content visualizing apparatus 310 is mounted on a vehicle, the content visualizing apparatus 310 dynamically visualizes the 3D content 161 in front of a driver.

The content visualizing apparatus 310 continuously expressed the depth through the HUD 313, and visualizes the content 361 having a depth of hundreds of meters ahead of the user 390. However, when an obstacle, for example, a blind spot caused due to a building or an uphill road, exists between the user 390 and the content 361 visualized to have a depth, an overlap is present between a 3D graphic representation corresponding to the content 361 visualized to have a depth and the obstacle. The overlap causes a visual fatigue of the user 390, or causes a crosstalk such that the user 390 recognizes an unnatural image.

The content visualizing apparatus 310 adjusts the content 361 to be visualized more naturally. An operation of the content visualizing apparatus 310 will be described further below.

Figure 4:
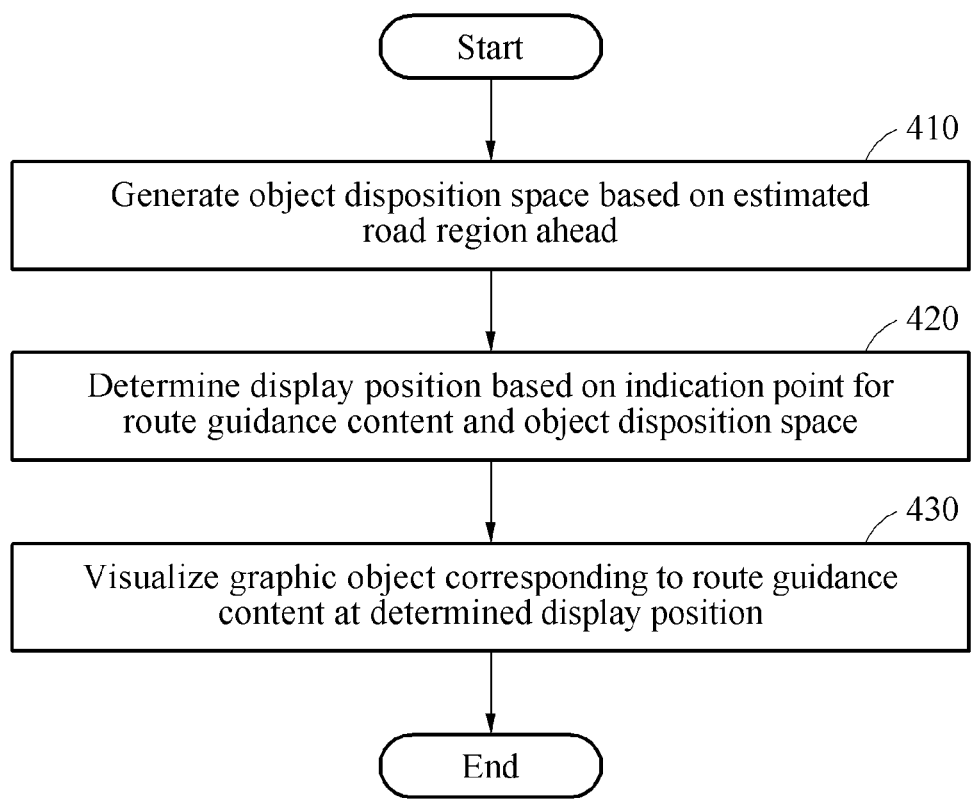
FIGS. 4 and 5 illustrate an example of a content visualizing method.
Figure 5:
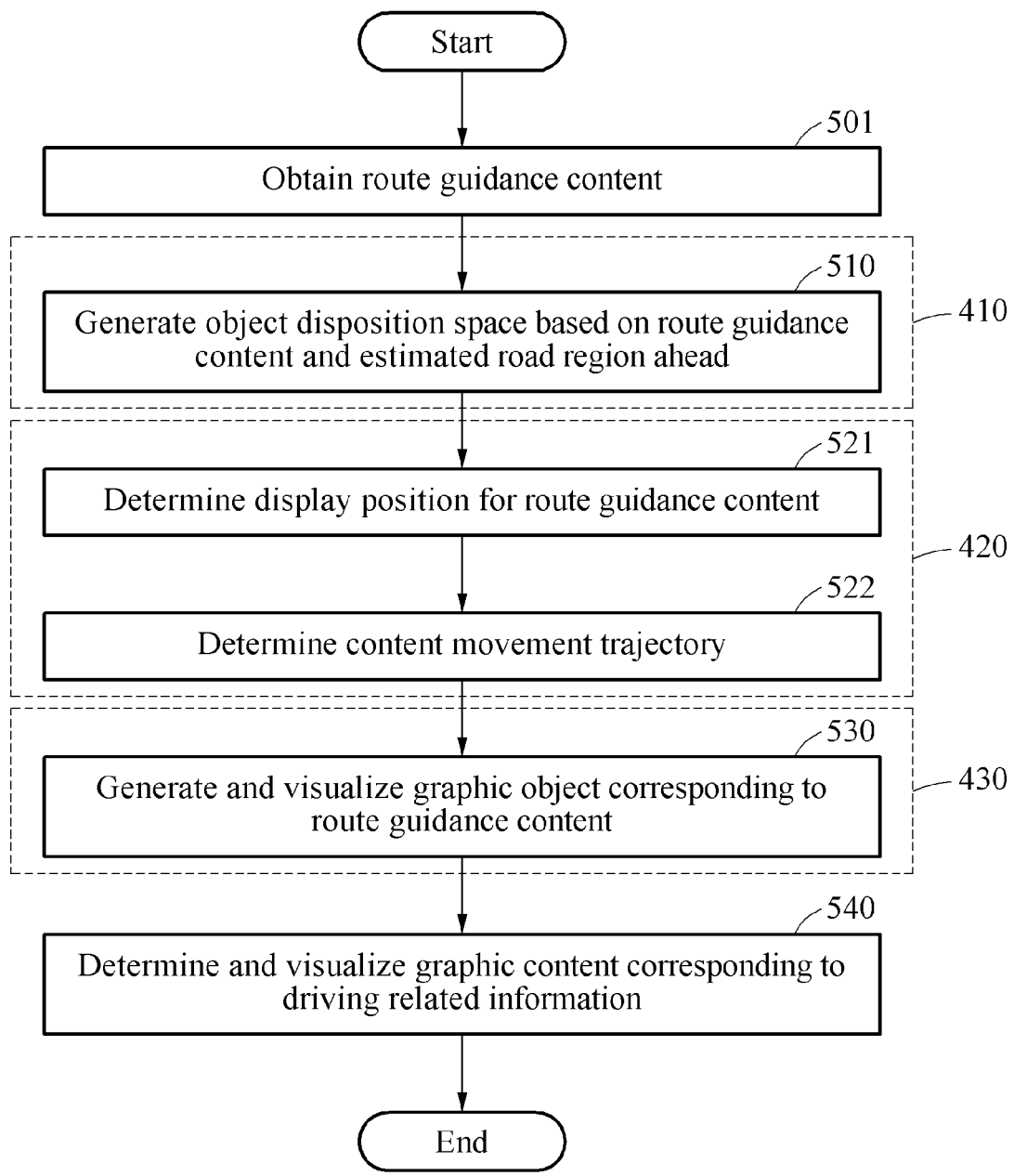

FIGS. 4 and 5 illustrate an example of a content visualizing method.

FIG. 4 is a diagram illustrating a content visualizing method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIG. 1-3 are also applicable to FIG. 4, and are incorporated herein by reference. Thus, the above description may not be repeated here.

Referring to FIG. 4, in operation 410, a content visualizing apparatus generates an object disposition space based on an road region that is estimated ahead. The content visualizing apparatus estimates the road region ahead from data sensed by a sensor, for example, images. The content visualizing apparatus determines a space corresponding to the road region ahead to be the object disposition space, in a space corresponding to an field of view (FOV). The content visualizing apparatus generates the object disposition space based on an FOV of a user and a distance from a viewpoint of the user to an obstacle. The content visualizing apparatus determines a space between the content visualizing apparatus and the obstacle to be the object disposition space, and excludes a space beyond the obstacle. Thus, the content visualizing apparatus determines only a space in a view of the user to be the object disposition space.

In operation 420, the content visualizing apparatus determines a display position for route guidance content based on an indication point of the route guidance content and the object disposition space. The content visualizing apparatus determine the indication point to be the display position, when the indication point is in the object disposition space. In another example, the content visualizing apparatus determines a position corresponding to the indication point in the object disposition space to be the display position, when the indication point is out of the object disposition space.

The point corresponding to the indication point in the object disposition space is, for example, a point at which an axis of gaze of the user, for example, an axis from a center of an eye box toward the indication point, intersects with a limiting face of the object disposition space. In another example, the display position is a point in the object disposition space, among points on the axis of gaze toward the indication point. In an example, the display position is a point within a margin distance from the limiting face of the object disposition space, among the points on the axis of gaze toward the indication point. The margin distance indicates a margin that is set to prevent the representation of a graphic object from being cut due to a limitation of the object disposition space. In other words, in an example, the display position includes a position corresponding to the point in the object disposition space to be the display position, in response to the point being located out of the object disposition space. In an example, the position corresponding to the point is located substantially close to a limiting plane of the object disposition space, and on an axis from a center of an eye box of the user toward the point.

In operation 430, the content visualizing apparatus visualizes a graphic object corresponding to the route guidance content at the determined display position. Thus, the content visualizing apparatus visualizes the graphic object in the object disposition space, which is a space recognizable by the user.

For example, the content visualizing apparatus visualizes the graphic object corresponding to the route guidance content to be fixed to the display position. In an example, the display position for the graphic object is fixed to planar coordinates. As the content visualizing apparatus approaches the display position, the content visualizing apparatus gradually reduces a depth of the graphic object. Thus, the user recognizes that the content visualizing apparatus approaches the graphic object fixed to the display position. However, examples are not limited thereto. The content visualizing apparatus dynamically adjusts the display position, thereby visualizing the graphic object while maintaining a relative distance from the content visualizing apparatus to the graphic object to be constant. The content visualizing apparatus dynamically adjusts the display position, thereby providing an animation effect. Implementation of such a visual effect will be described further with reference to FIGS. 17, 20, and 23.

For reference, a position corresponds to absolute coordinates. Relative coordinates based on the content visualizing apparatus are also referred to as a relative position.

FIG. 5 is a diagram illustrating the content visualizing method in further detail. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIG. 1-4 are also applicable to FIG. 5, and are incorporated herein by reference. Thus, the above description may not be repeated here.

Referring to FIG. 5, in operation 501, the content visualizing apparatus obtains route guidance content. The content visualizing apparatus generates route guidance information based on a route to a destination, and generates the route guidance content based on the generated route guidance information. The content visualizing apparatus generates route guidance content corresponding to a indication point included in the route guidance information, when a distance to the indication point is less than a threshold distance.

In operation 510, the content visualizing apparatus generates an object disposition space based on the route guidance information and an estimated road region ahead. In an example, the content visualizing apparatus determines whether a road ahead is uphill or downhill from the route guidance information. When the road is uphill, the content visualizing apparatus may restrict the object disposition space based on an intersection of the object disposition space and a surface of the uphill road. Further, the content visualizing apparatus restricts the object disposition space based on a road surface detected by a depth sensor or a road surface estimated from image data. The content visualizing apparatus determines a region of travel that the content visualizing apparatus is predicted to travel based on a guided path indicated by the route guidance information. When the route guidance information indicates a right turn at an intersection, the region of travel includes a region corresponding to the right turn, and a region corresponding to a left turn is excluded. In an example, the content visualizing apparatus determines a space corresponding to the region of travel in a road region ahead of a space corresponding to an FOV to be the object disposition space. Since the user principally gazes at the region of travel, the content visualizing apparatus generates a region on which the gaze of the user is focused to be the object disposition space. However, examples are not limited thereto. In another example, the content visualizing apparatus generates the object disposition space irrespective of the route guidance information.

In operation 521, the content visualizing apparatus determines a display position for the route guidance content. When the indication point of the route guidance content is in the object disposition space, the content visualizing apparatus determines the corresponding indication point to be the display position for the route guidance content. When the indication point is out of the object disposition space, the content visualizing apparatus determines a position in the object disposition space to be the display position. In this example, the content visualizing apparatus updates the display position to be within the object disposition space, when a distance from the user to the display position is greater than a maximum distance of the object disposition space. In an example, the content visualizing apparatus adjusts, for example, reduces, only a depth of the display position and maintains remaining coordinates, for example, a height, thereby determining the position in the object disposition space to be the display position.

In operation 522, the content visualizing apparatus determines a content movement trajectory. In an example, the content visualizing apparatus determines the content movement trajectory based on an FOV of the user and a body of a vehicle. The content movement trajectory is, for example, a trajectory from a road surface through a front edge of the body of the vehicle to a region, for example, an eye box, corresponding to an eye of the user. The content movement trajectory defines a height of the graphic object according to a distance between the display position and the content visualizing apparatus. The content movement trajectory will be described further below with reference to FIG. 14.

In operation 530, the content visualizing apparatus generates and visualizes a graphic object corresponding to the route guidance content. The content visualizing apparatus visualizes the graphic object at a fixed display location, or visualizes the graphic object based along a moving display location. In an example, the content visualizing apparatus visualizes the graphic object to a height determined based on the content movement trajectory. The content movement trajectory is a trajectory determined to fit the FOV of the user. Thus, the content visualizing apparatus stably provides the graphic object to the user even when the display position for the route guidance content is close to the user.

In operation 540, the content visualizing apparatus determines and visualizes a graphic object corresponding to driving related information. The content visualizing apparatus visualizes a graphic object corresponding to additional information, other than the route guidance content. The content visualizing apparatus visualizes the graphic object corresponding to the driving related information in a corner space, for example, a lower end portion of a projection plane, adjacent to the user in the object disposition space.

Figure 6:
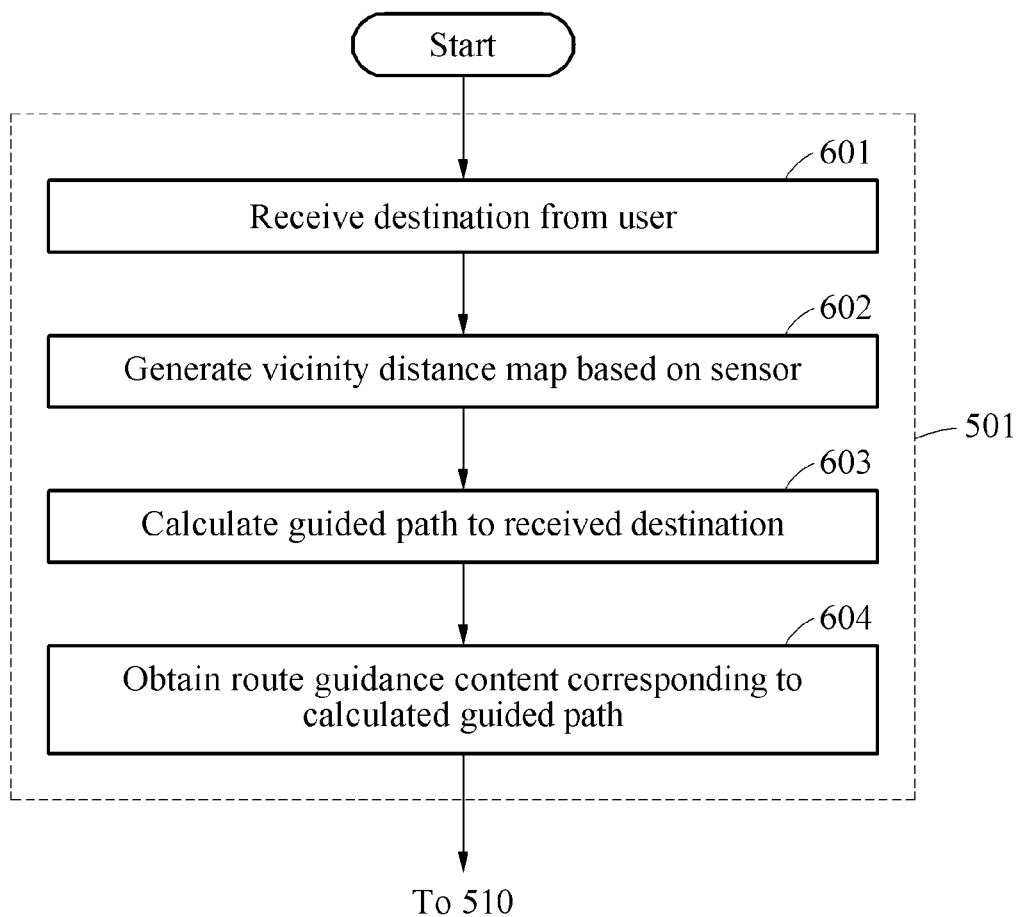
FIG. 6 illustrates an example of obtaining route guidance content.

FIG. 6 illustrates an example of obtaining route guidance content. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIG. 1-5 are also applicable to FIG. 6, and are incorporated herein by reference. Thus, the above description may not be repeated here.

Referring to FIG. 6, in operation 601, the content visualizing apparatus receives a destination from the user. In an example, the content visualizing apparatus obtains the destination desired by the user, in response to a user input. The destination is, for example, a geographical position.

In operation 602, the content visualizing apparatus generates a vicinity distance map based on a sensor. The vicinity distance map is a map indicating a distance to a target point, for example, an obstacle, existing in a vicinity of the content visualizing apparatus. The content visualizing apparatus generates the vicinity distance map based on a color image, a depth image, and LIDAR data.

In operation 603, the content visualizing apparatus calculates a guided path to the destination. The content visualizing apparatus determines the guided path from a current position to the destination based on lanes on which a vehicle can travel.

In operation 604, the content visualizing apparatus obtains route guidance content corresponding to the calculated guided path. Directions to travel along the guided path calculated in operation 603 are provided to the user at various guidance points, for example, intersections. The content visualizing apparatus obtains route guidance contents with respect to a plurality of indication points corresponding to the guided path.

Figure 7:
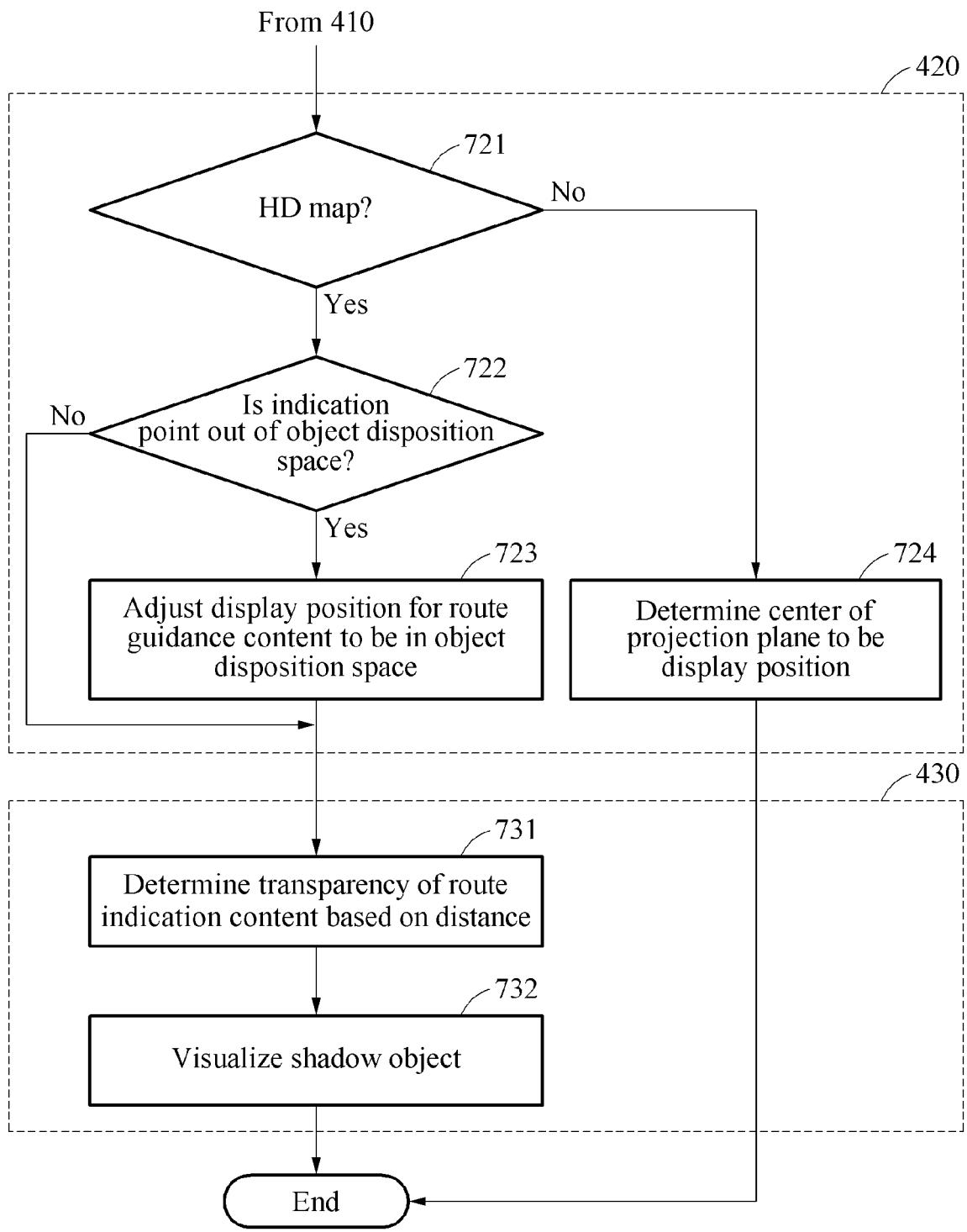
FIG. 7 illustrates an example of determining a display position and visualizing a graphic object.

FIG. 7 illustrates an example of determining a display position and visualizing a graphic object. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIG. 1-6 are also applicable to FIG. 7, and are incorporated herein by reference. Thus, the above description may not be repeated here.

Referring to FIG. 7, in operation 721, the content visualizing apparatus determines whether map data is an HD map. As described above, the HD map is map data including precise information such as the number of lanes.

When the map data is an HD map, the content visualizing apparatus determines a display position at which route guidance content is to be visualized. In operation 722, the content visualizing apparatus determines whether an indication point is out of an object disposition space. When the indication point of the route guidance content is out of the object disposition space, in operation 723, the content visualizing apparatus adjusts the display position for the route guidance content to be in the object disposition space. As described above, the content visualizing apparatus determines a point in the object disposition space, among points on an axis of gaze toward the indication point, to be the display position. The content visualizing apparatus determines the indication point of the route guidance content to be the display position, when the indication point is in the object disposition space.

When the map data is not an HD map, in operation 724, the content visualizing apparatus determines a center of a projection plane to be the display position. When the map data is a standard definition (SD) map, it is difficult to fit the object disposition space accurately in a physical world. Thus, in an example, the content visualizing apparatus determines the display position for the route guidance content at random. However, examples are not limited thereto. In an example, the content visualizing apparatus determines the display position for the route guidance content to be in the object disposition space, irrespective of the map data.

In operation 731, the content visualizing apparatus determines a transparency of route indication content based on a distance. The route indication content is, for example, a path indicating line which indicates a guided path from a current position to a destination. The route indication content is, for example, a set of points through which a center point of a vehicle is predicted to pass. In a straight section, the route indication content is an indication line which passes through a center of a lane. In a turn section, for example, a right turn section or a left turn section, the route indication content is a curved indication line which passes through a center of a lane to enter the turn section and a center of a lane to exit the turn section.

The content visualizing apparatus allocates a relatively high transparency to a portion of the route indication content adjacent to a boundary face of the route disposition space. The content visualizing apparatus visualizes an end of the route indication content to fade out by gradually increasing the transparency of the route indication content in a direction toward the route disposition space. Thus, the content visualizing apparatus naturally integrates the route indication content with a real world.

In operation 732, the content visualizing apparatus visualizes a shadow object. The content visualizing apparatus represents the shadow object under the graphic object corresponding to the route guidance content, thereby improving a sense of reality of the corresponding graphic object. Visualization of the shadow object will be described further with reference to FIG. 24.

Figure 8:
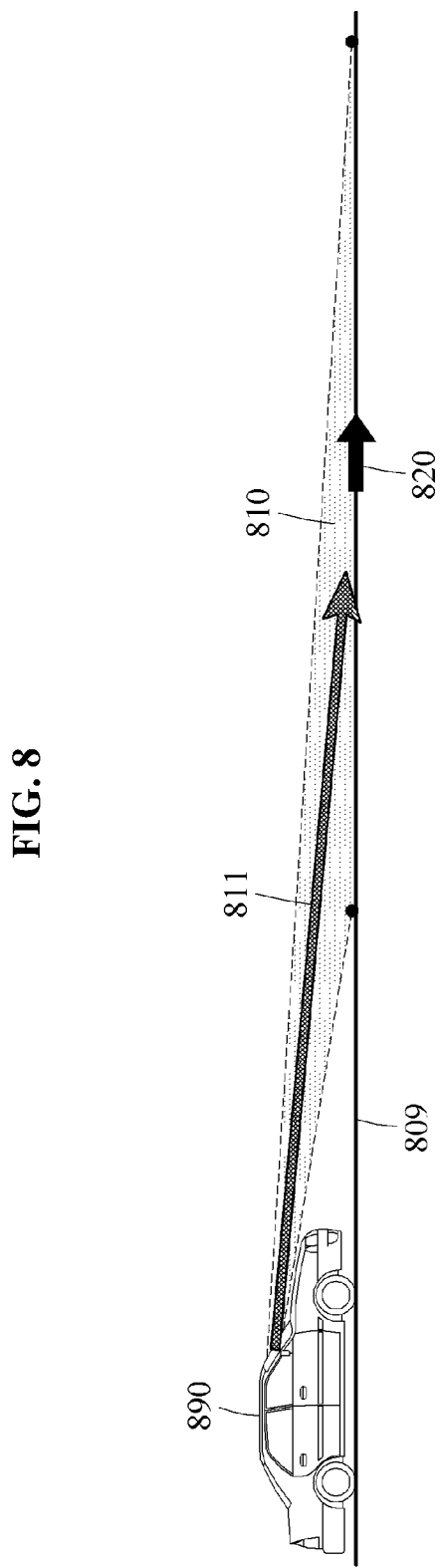
FIGS. 8 through 10 illustrate examples of a graphic object having a display position determined to be in an object disposition space.
Figure 9:
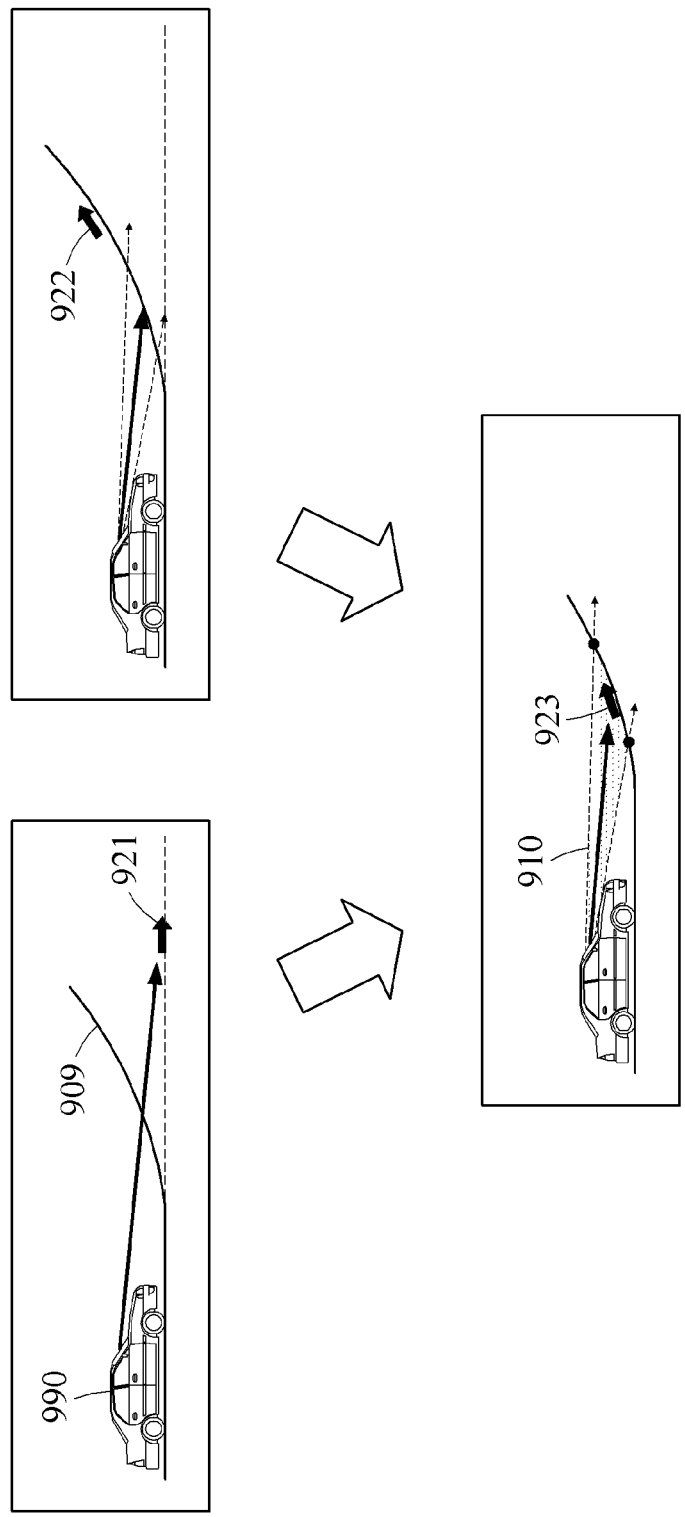
Figure 10:
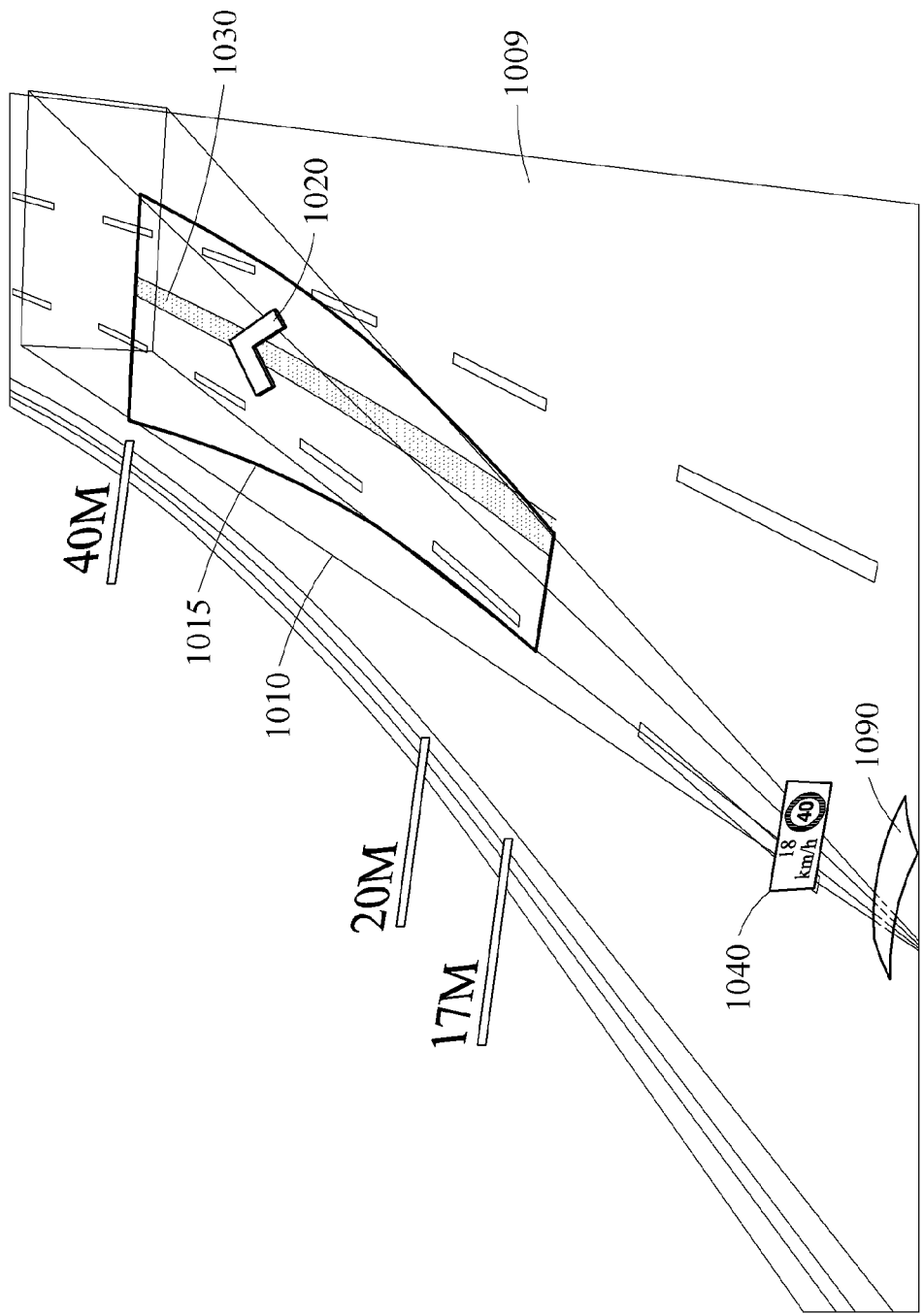

FIGS. 8 through 10 illustrate examples of a graphic object having a display position determined to be in an object disposition space.

FIG. 8 is a side view illustrating an example of a content visualizing apparatus mounted on a vehicle 890.

The content visualizing apparatus determines a display position for route guidance content in an object disposition space 810. The content visualizing apparatus generates the object disposition space 810 based on a road region estimated with respect to a vicinity of the vehicle 890 such that a bottom of the object disposition space 810 fits to a road surface 809 of the road region. The content visualizing apparatus fits the bottom of the object disposition space 810 to the road surface 809, up to a maximum distance from a portion in which the road surface 809 and a space corresponding to an FOV intersect.

The content visualizing apparatus visualizes a graphic object 820 corresponding to the route guidance content on the bottom of the object disposition space 810. The object disposition space 810 is a space in which a view 811 of the user is secured, and thus the user gazes at the graphic object 820.

FIG. 9 is a side view illustrating a display position for a graphic object with respect to a vehicle 990 travelling on an uphill road.

For example, when a content visualizing apparatus enters an uphill road, an indication point of route guidance content that may be located at a position farther from a road surface 909 relative to the vehicle 990. A graphic object 921 that is visualized at a position farther than the road surface 909 is occluded by the road surface 909 which is at a position that is closer to the vehicle 990, thus, causing crosstalk to a user. A graphic object 922 visualized at a position higher than the road surface 909 while maintaining a horizontal distance is out of an FOV of the user, thus, the user may not observe the corresponding graphic object 922.

In an example, the content visualizing apparatus generates an object disposition space 910 based on road information and view information, thereby fitting the object disposition space 910 to the road surface 909. The content visualizing apparatus fits a height of a display position to a bottom of the object disposition space 910, when a height of an indication point is lower than the bottom of the object disposition space 910. The content visualizing apparatus visualizes a graphic object 923 corresponding to the route guidance content on the bottom of the object disposition space 910. Thus, even when the indication point is occluded by an obstacle such as an uphill road, the content visualizing apparatus determines a point closer to the vehicle 990 than the indication point to be the display position, thereby stably providing the route guidance content to the user.

FIG. 10 illustrates a perspective view of an object disposition space on the uphill road of FIG. 9. The object disposition space is determined from a space 1010 corresponding to a view of a user over a windshield 1090 of a vehicle. The space 1010 corresponding to the view is a space in the shape of a quadrangular pyramid, as shown in FIG. 10.

For example, the content visualizing apparatus determines an intersection face 1015 on which the space 1010 corresponding to the view and a road surface 1009 intersect. The intersection face 1015 is also referred to as, for example, a far clipping plane. The content visualizing apparatus determines the intersection face 1015 to be a boundary face of the object disposition space. The content visualizing apparatus determines a display position for route guidance content 1020 to be on the boundary face determined as described above, thereby visualizing a graphic object fit to the road surface 1009. In an example, the content visualizing apparatus visualizes a path indicating line 1030 to fit to the bottom face of the object disposition space, for example, the boundary face. The content visualizing apparatus visualizes driving related information 1040 in a space adjacent to a projection plane.

On the uphill road, the boundary face of the object disposition space 1010 is restricted by the road surface, thus, a distance at which an object may be disposed decreases. In the example of FIG. 10, a maximum distance at which the object disposition space 1010 may be visualized decreases to 40 m.

Figure 11:
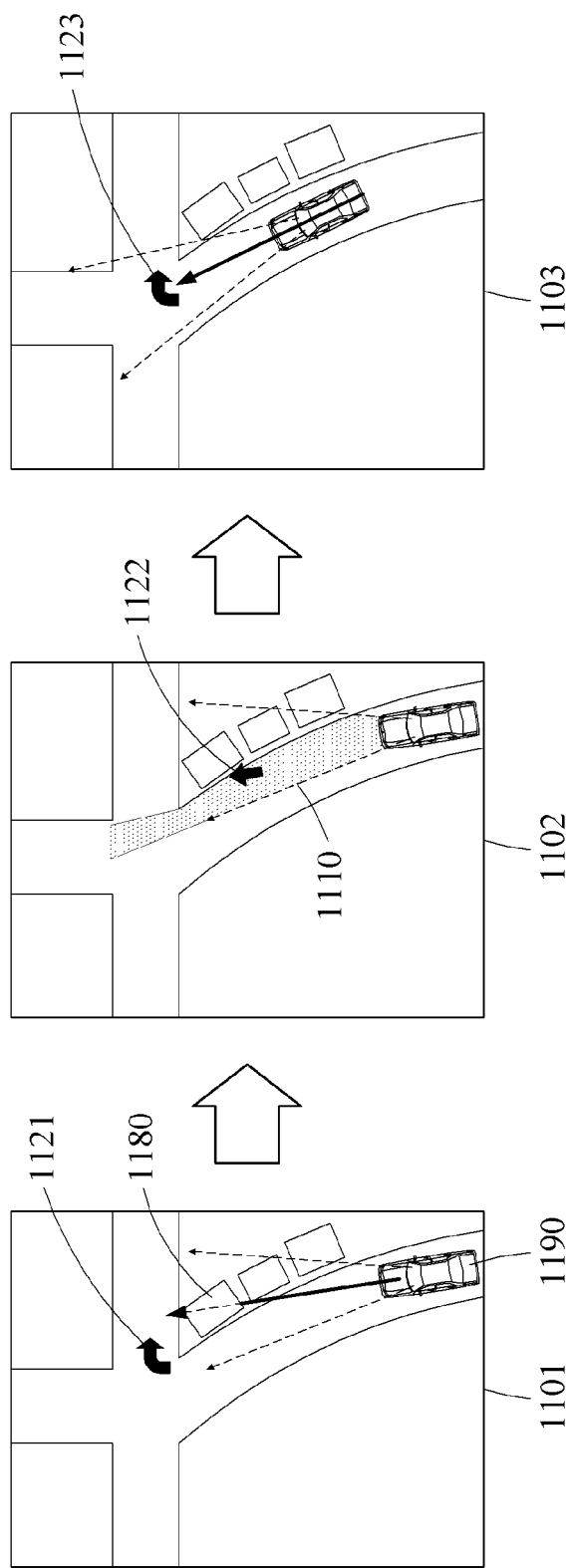
FIGS. 11 and 12 illustrate examples of determining a display position for a graphic object corresponding to route guidance content when an indication point is occluded.
Figure 12:
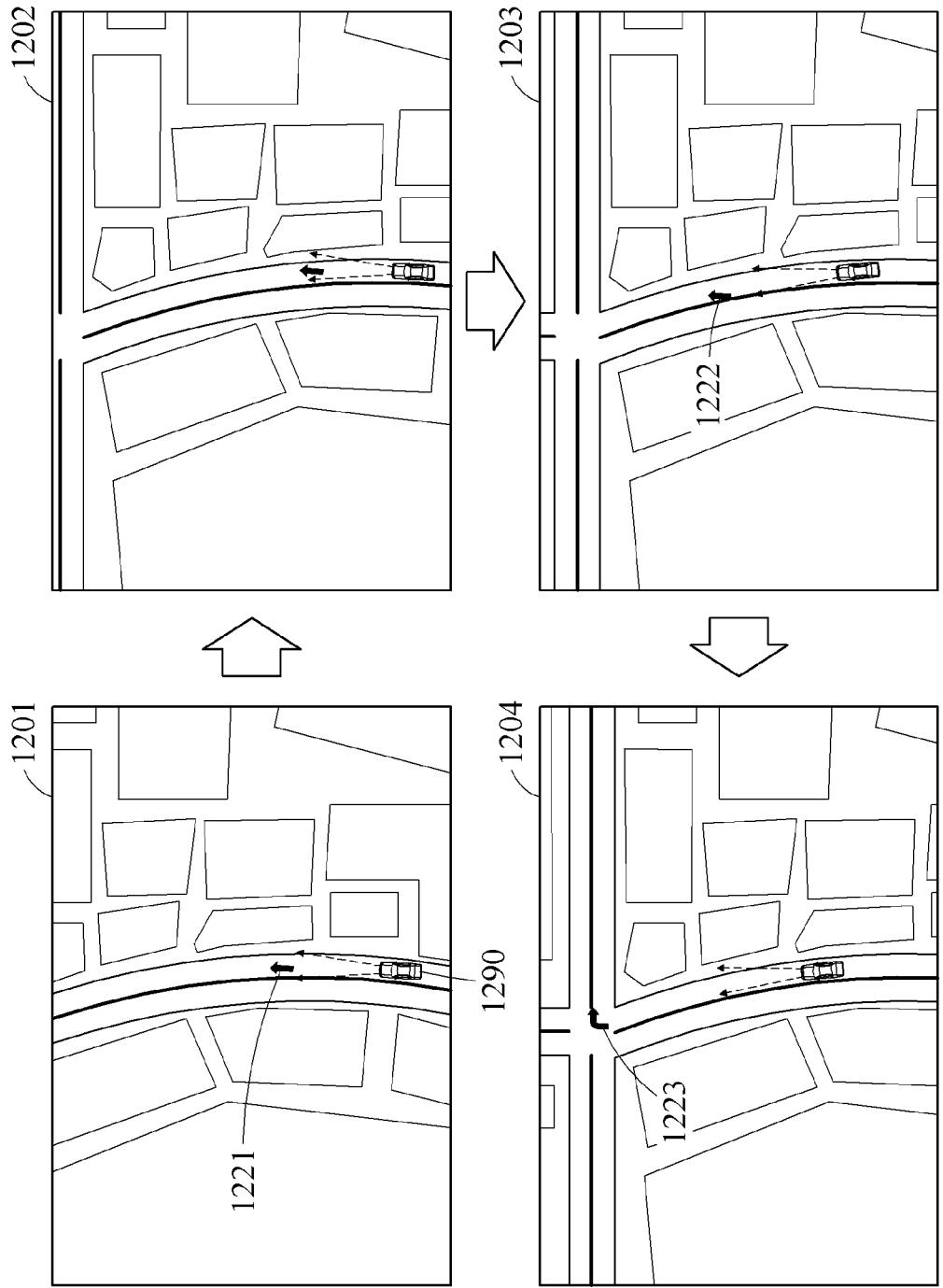

FIGS. 11 and 12 illustrate examples of determining a display position for a graphic object corresponding to route guidance content when an indication point is occluded.

FIG. 11 is a bird's eye view illustrating a circumstance in which a view of a user with respect to an indication point is blocked.

At a first viewpoint 1101, a content visualizing apparatus determines whether a gaze of a user reaches route guidance content 1121 visualized at an indication point. The content visualizing apparatus determines that a view of the user is blocked when an obstacle 1180 exists between a vehicle 1190 and the route guidance content 1121 corresponding to the indication point.

At a second viewpoint 1102, the content visualizing apparatus regenerates an object disposition space 1110 based on an obstacle. The content visualizing apparatus determines a face occluded by the obstacle to be the boundary face of the object disposition space. In an example, the content visualizing apparatus determines a point in the object disposition space adjacent to the boundary face along an axis of gaze from the vehicle 1190 toward the indication point to be the display position. The content visualizing apparatus visualizes a graphic object corresponding to the route guidance content 1121 at the determined display position.

At a third point 1103, the content visualizing apparatus visualizes a graphic object corresponding to route guidance content 1123 at the indication point, when the view with respect to the indication point is secured. The content visualizing apparatus disposes graphic objects in advance at locations to be reached by a driver such as, for example, a turn point, a detour point, and intersection entrance points, to inform the user of the corresponding locations in advance.

FIG. 12 is a bird's eye view illustrating a visualization operation when an indication point differs from a display position.

When an indication point differs from a display position, a content visualizing apparatus obtains temporary guidance content corresponding to the display position. The content visualizing apparatus visualizes a graphic object corresponding to the temporary guidance content at the display position until an object disposition space includes the indication point. The content visualizing apparatus changes the display position for the graphic object corresponding to the temporary guidance content as the content visualizing apparatus moves, thereby maintaining a relative distance from the content visualizing apparatus to the graphic object.

For example, at a first viewpoint 1201, a view from a vehicle 1290 to an indication point is not secured. The content visualizing apparatus generates an object disposition space restricted by an obstacle since the indication point differs from a display position. The content visualizing apparatus determines the display position to be in the object disposition space. In the example of FIG. 12, the vehicle 1290 needs to make a right turn at an intersection. However, since the display position determined at the first viewpoint 1201 is on a straight road, the content visualizing apparatus obtains temporary guidance content 1221 indicating a straight advance. The content visualizing apparatus determines a display position for the temporary guidance content 1221 to be a point on a path indicating line. However, examples are not limited thereto.

At a second viewpoint 1202, the view from the vehicle 1290 to the indication point is still not secured. The content visualizing apparatus visualizes the temporary guidance content 1221 generated previously at the first viewpoint 1201 while maintaining a distance from the vehicle 1290.

At a third viewpoint 1203, the view from the vehicle 1290 to the indication point is secured. However, the content visualizing apparatus visualizes the graphic object while gradually moving the graphic object from a previous display position to a new display position, in response to the display position being changed while the graphic object is visualized. The content visualizing apparatus gradually moves the temporary guidance content 1221 from a previous display position to a next display position. Further, the content visualizing apparatus gradually deforms the graphic object from the temporary guidance content 1221 to intermediate content 1222 and to a graphic object corresponding to route guidance content 1223.

Herein, the gradual deformation of the graphic object and the gradual change, for example, movement, of the display position are performed continuously. The content visualizing apparatus naturally visualizes the graphic object gradually deformed or moved for each frame at a designated frame rate, for example, 30 frames per second (fps), 60 fps, or 120 fps.

At a fourth viewpoint 1204, the content visualizing apparatus visualizes the graphic object corresponding to the route guidance content 1223 at the indication point. The content visualizing apparatus visualizes the route guidance content 1223 to be fixed to the indication point until the vehicle 1290 reaches the indication point. At the fourth viewpoint 1204, the content visualizing apparatus visualizes the deformed graphic object.

Figure 13:
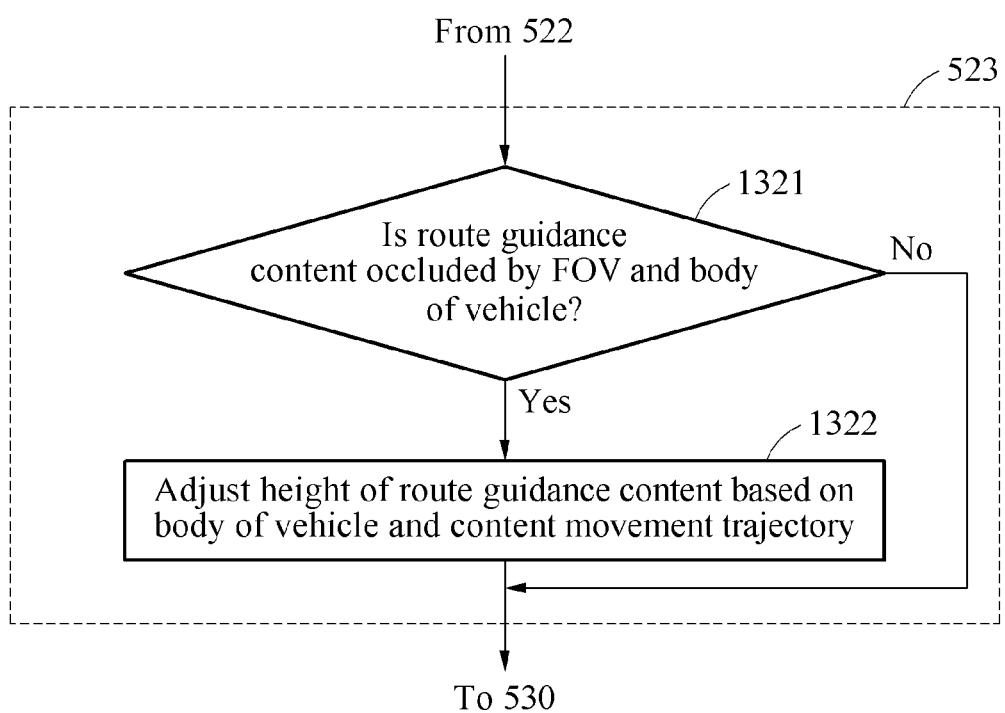
FIGS. 13 and 14 illustrate an example of visualizing route guidance content based on a content movement trajectory.
Figure 14:
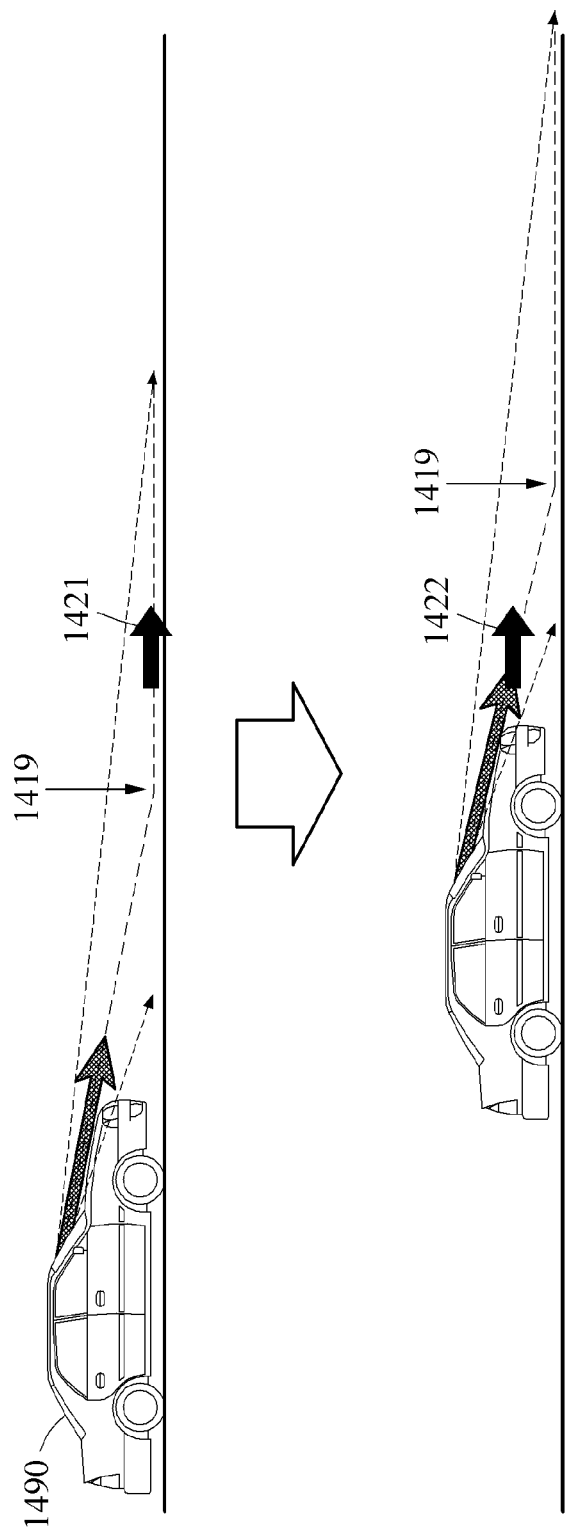

FIGS. 13 and 14 illustrate an example of visualizing route guidance content based on a content movement trajectory. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the descriptions of FIG. 1-12 are also applicable to FIG. 13, and are incorporated herein by reference. Thus, the above description may not be repeated here.

As described in operation 522 of FIG. 5, the content visualizing apparatus determines a content movement trajectory 1419 based on an FOV of a user and a body of a vehicle 1490.

In operation 1321, the content visualizing apparatus determines whether the route guidance content is occluded by the FOV and the body of the vehicle 1490. When a distance between the vehicle 1490 and the indication point is less than a threshold distance, the route guidance content is occluded by the body, for example, a hood, of the vehicle 1490. When the distance between the indication point and the current position is less than the threshold distance, the content visualizing apparatus determines that the route guidance content is occluded.

In operation 1322, when the route guidance content is occluded, the content visualizing apparatus adjusts a height of the route guidance content based on the body of the vehicle 1490 and the content movement trajectory 1419. The content visualizing apparatus generates an object disposition space based on the body of the vehicle 1490 on which the content visualizing apparatus is mounted and the FOV of the user. The content visualizing apparatus additionally utilizes the content movement trajectory 1419 to naturally change the height of the graphic object in the generated object disposition space. When the content visualizing apparatus approaches the indication point, the content visualizing apparatus visualizes the graphic object by adjusting the height of the graphic object based on the content movement trajectory 1419.

As shown in FIG. 14, the vehicle 1490 approaches a graphic object 1421 visualized at the indication point. The content visualizing apparatus provides the user with a graphic object 1422 that is visualized at a height determined based on the content movement trajectory 1419 in response to the approach. The content movement trajectory 1419 is a trajectory in which a height is fit to a road surface with respect to a region beyond a threshold distance from the content visualizing apparatus. The content movement trajectory 1419 is a trajectory reaching a region corresponding to an eye of the user from the road surface through a front edge of the body of the vehicle 1490 with respect to a region within the threshold distance.

Figure 15:
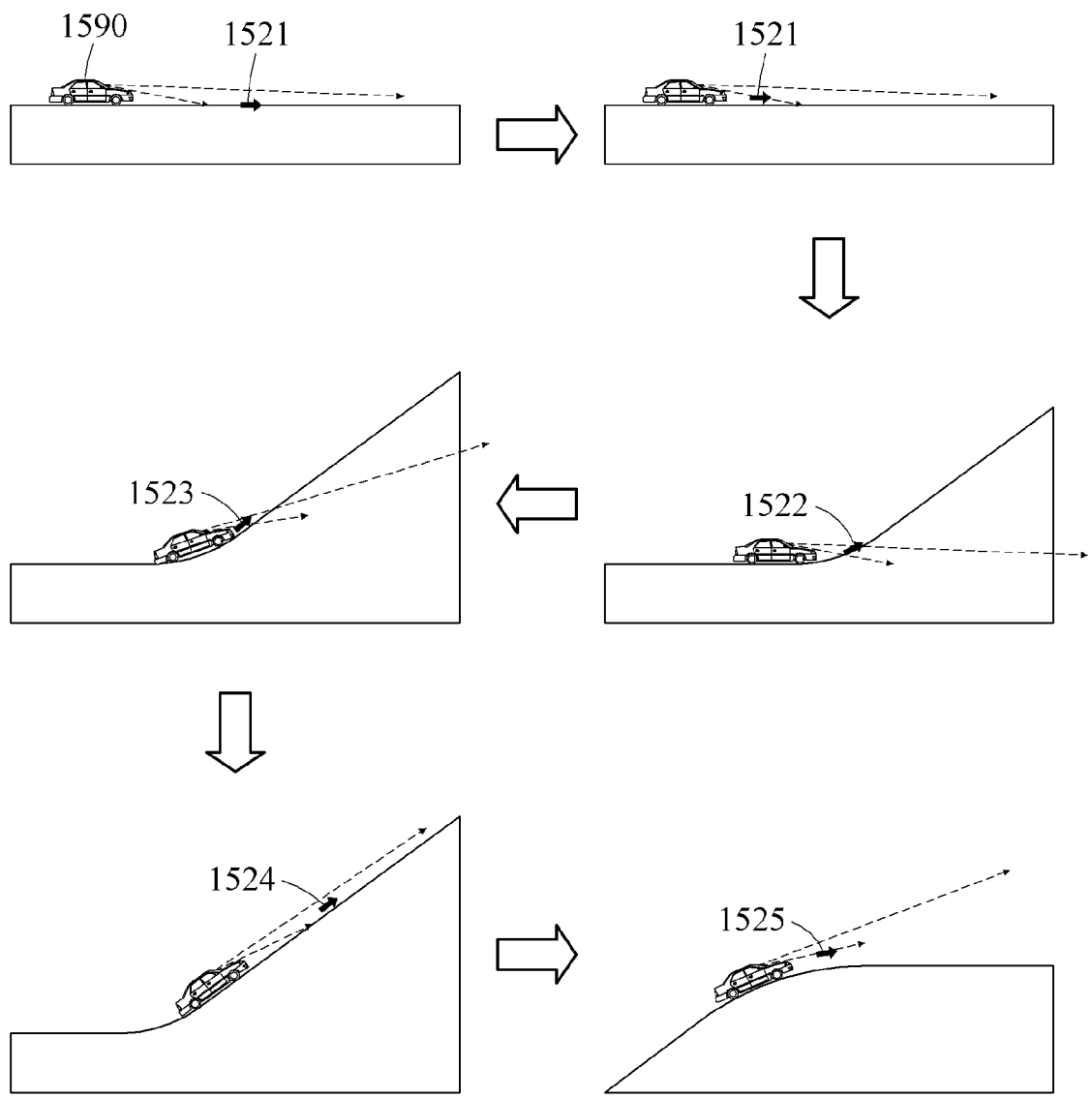
FIG. 15 illustrates an example of determining a display position for route guidance content while a content visualizing apparatus is entering and exiting an uphill road.

FIG. 15 illustrates an example of determining a display position for route guidance content while a content visualizing apparatus is entering and exiting an uphill road.

A content visualizing apparatus may visualize route guidance content at a display point, and may fix the display position until the content visualizing apparatus reaches the display point. As shown in FIG. 15, the content visualizing apparatus visualizes first content 1521 in an object disposition space, and maintains a position of the first content 1521 until the content visualizing apparatus reaches the first content 1521. Thus, a user may recognize that the content visualizing apparatus is approaching the first content 1521.

In an example, the content visualizing apparatus determines a subsequent display position for subsequent route guidance content when the content visualizing apparatus reaching a current display point for the current route guidance content. The content visualizing apparatus visualizes a graphic object corresponding to the subsequence route guidance content at the subsequent display position. As shown in FIG. 15, the content visualizing apparatus visualizes second content 1522 when the content visualizing apparatus reaches a point corresponding to the first content 1521.

Since a view is restricted on an uphill road, the second content 1522 is visualized at a position close to a vehicle 1590. The content visualizing apparatus visualizes third content 1523 in response to the content visualizing apparatus reaching the second content 1522. As shown in FIG. 15, the view is restricted when the content visualizing apparatus enters the uphill road, and a relatively small object disposition space is generated. After entering the uphill road, the content visualizing apparatus visualizes fourth content 1524 at a distance similar to that on a level ground.

When a road surface and a space corresponding to a view of the user do not intersect each other, the content visualizing apparatus fits a height of the display position to a bottom of the object disposition space. In the example of FIG. 15, when the vehicle 1590 exits the uphill road, the bottom face of the object disposition space is spaced apart from the road surface. That is, the road surface is out of the view of the user. The content visualizing apparatus visualizes fifth content 1525 to fit to the bottom face of the object disposition space, rather than fitting to the road surface.

Although FIG. 15 illustrates the uphill road, the content visualizing apparatus visualizes route guidance content on a downhill road in the similar manner. For example, entering the uphill road corresponds to exiting the downhill road, and exiting the uphill road corresponds to entering the downhill road.

Figure 16:
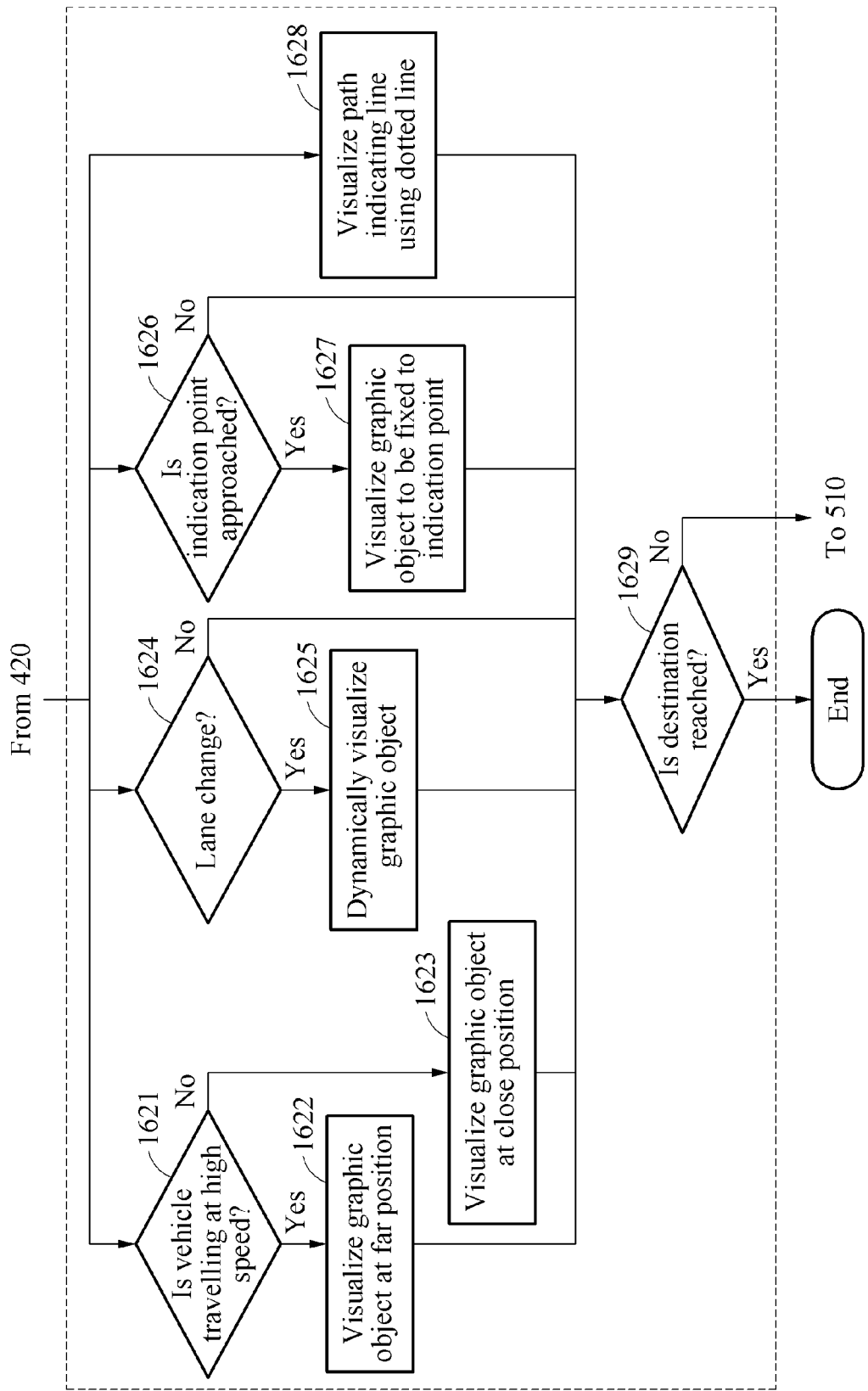
FIG. 16 illustrates an example of a content visualizing method.

FIG. 16 illustrates an example of a content visualizing method. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer that perform the specified functions, or combinations of special purpose hardware and computer instructions. In addition to the description of FIG. 16 below, the descriptions of FIG. 1-15 are also applicable to FIG. 16, and are incorporated herein by reference. Thus, the above description may not be repeated here.

Referring to FIG. 16, in operation 1621, the content visualizing apparatus determines whether a vehicle is travelling at a high speed. The content visualizing apparatus determines whether the speed of the vehicle exceeds a threshold speed.

In operation 1622, when the vehicle is travelling at a high speed, the content visualizing apparatus visualizes a graphic object at a relatively far position, for example, a second position. When the vehicle is travelling at a high speed, a driver is expected to be gazing at a relatively farther position. Thus, the content visualizing apparatus determines a position corresponding to the gaze of the driver to be a display position. The second position is, for example, a position 50 m ahead. However, examples are not limited thereto.

In operation 1623, when the vehicle is not travelling at a high speed, the content visualizing apparatus visualizes the graphic object at a relatively close position, for example, a first position. When the vehicle is travelling at a low speed, the driver is expected to be gazing at a relatively closer position. Thus, the content visualizing apparatus determines a position corresponding to the gaze of the driver to be the display position. The first position is, for example, a position 15 m ahead. However, examples are not limited thereto.

In the above example, the speed is divided into two stages. However, examples are not limited thereto. In another example, the content visualizing apparatus classifies the speed of the vehicle as one of n speed sections, and visualizes a graphic object at a display position corresponding to the classified speed section. Here, n is an integer greater than or equal to "1".

In operation 1624, the content visualizing apparatus determines whether a lane change is needed. The content visualizing apparatus determine whether to change a lane based on route guidance information. For example, when it is difficult to make a turn, for example, a left turn or a right turn, on a current lane although the turn needs to be made, the content visualizing apparatus determines that the vehicle needs to move to a lane from which it is possible to make the turn.

In operation 1625, when a lane change is needed, the content visualizing apparatus dynamically visualizes the graphic object. The content visualizing apparatus visualizes a continuous trajectory to move the graphic object from the content visualizing apparatus to the indication point, thereby inducing an action of the driver.

However, the dynamic visualization of the graphic object is not limited to a lane change event. The content visualizing apparatus dynamically visualizes the graphic object corresponding to the route guidance content, when an event is detected that requires an active action of the user, for example, a turn or a lane change. The dynamic visualization of the graphic object includes an operation of continuously visualizing the graphic object while repeatedly moving the display position from a current position of the content visualizing apparatus to the indication point along a path indicating line. The dynamic visualization will be described below with reference to FIG. 20.

In operation 1626, when the content visualizing apparatus approaches the indication point, the content visualizing apparatus visualizes the graphic object to be fixed to the indication point, in operation 1627. When a distance between the indication point and the position of the content visualizing apparatus is less than an indication required distance, the content visualizing apparatus visualizes the route guidance content at the indication point, i.e., the content visualizing apparatus may pin the route guidance content at the indication point. When the indication point is out of the object disposition space, the content visualizing apparatus newly determines a display point in the object disposition space and visualizes the graphic object at the display point. When a number of information related to a route leading to a destination is provided at once, driving is interrupted by graphic objects corresponding to the information. Thus, to prevent a number of indications being included in a guided path at the same time, the content visualizing apparatus provides route guidance content corresponding to an indication when the content visualizing apparatus approaches a distance at which the indication is needed.

In operation 1628, the content visualizing apparatus visualizes the path indicating line using a dotted line. The content visualizing apparatus enables the user to recognize a distance by displaying route indication content using dots disposed at intervals. Visualization of the path indicating line will be described below with reference to FIG. 18.

In operation 1629, the content visualizing apparatus determines whether the destination is reached. The content visualizing apparatus terminates the operation associated with the route guidance when the destination being reached. The content visualizing apparatus performs operation 510 when the destination is not reached.

Further, when the vehicle is out of the guided path, the content visualizing apparatus calculates a detour and visualizes a path indicating line corresponding to the detour. For example, when the vehicle is out of the guided path by mistake of the driver, the content visualizing apparatus visualizes the detour in advance using route guidance content and route indication content, thereby suggesting a new route to the driver.

Figure 17:
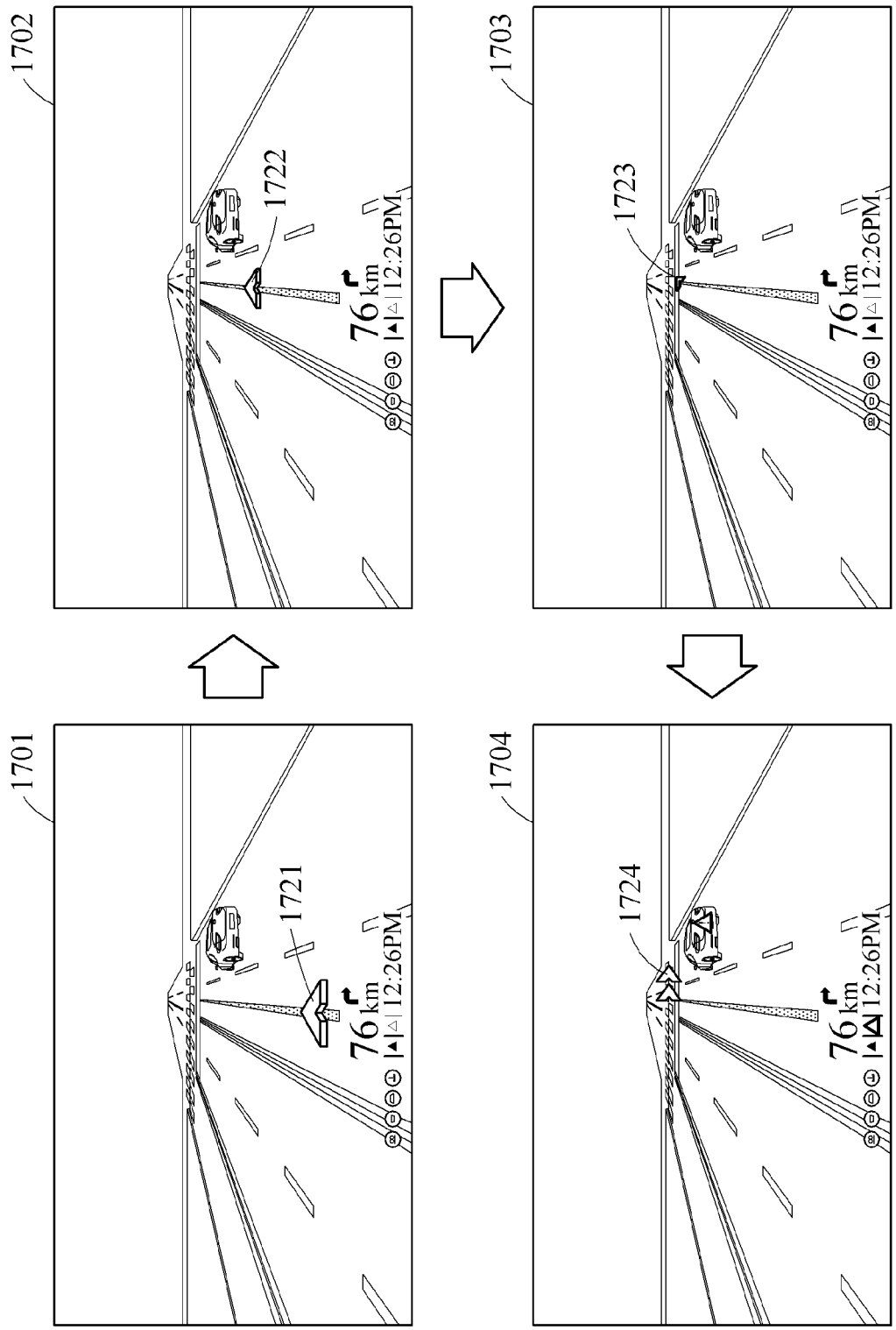
FIG. 17 illustrates an example of changing a position of route guidance content and deforming a graphic object by a content visualizing apparatus in response to a view being secured.

FIG. 17 illustrates an example of changing a position of route guidance content and deforming a graphic object by a content visualizing apparatus when a view is secured.

In operations 1626 and 1627 of FIG. 16, the content visualizing apparatus visualizes a graphic object corresponding to route guidance content at an indication point when the content visualizing apparatus approaching the indication point.

At a first viewpoint 1701, the content visualizing apparatus determines whether a distance to the indication point is less than an indication required distance. In an example, the content visualizing apparatus also determines whether the indication point is included in an object disposition space. In an example, the indication required distance is, for example, a maximum distance of the object disposition space. However, examples are not limited thereto. In response to determination that the indication point is included in the object disposition space, the content visualizing apparatus visualizes first route guidance content 1721.

The content visualizing apparatus visualizes second route guidance content 1722 at a second viewpoint 1702 by moving the first route guidance content 1721 of the first viewpoint 1701. The content visualizing apparatus visualizes third route guidance content 1723 at a third viewpoint 1703 by moving the second route guidance content 1722. The content visualizing apparatus visualizes fourth route guidance content 1724 at the indication point at a fourth viewpoint 1704. The content visualizing apparatus gradually deforms a shape of the graphic object for each frame from the first route guidance content 1721 to the fourth route guidance content 1724. Further, the content visualizing apparatus visualizes the first route guidance content 1721 through the fourth route guidance content 1724 moved for each frame along a path indicating line, thereby visualizing the route guidance content as being deformed and moved. Thus, the content visualizing apparatus induces the user to travel along a route along which the content visualizing apparatus needs to travel by moving the route guidance content, and guides a point at which an action is to be performed, for example, a turn point.

Figure 18:
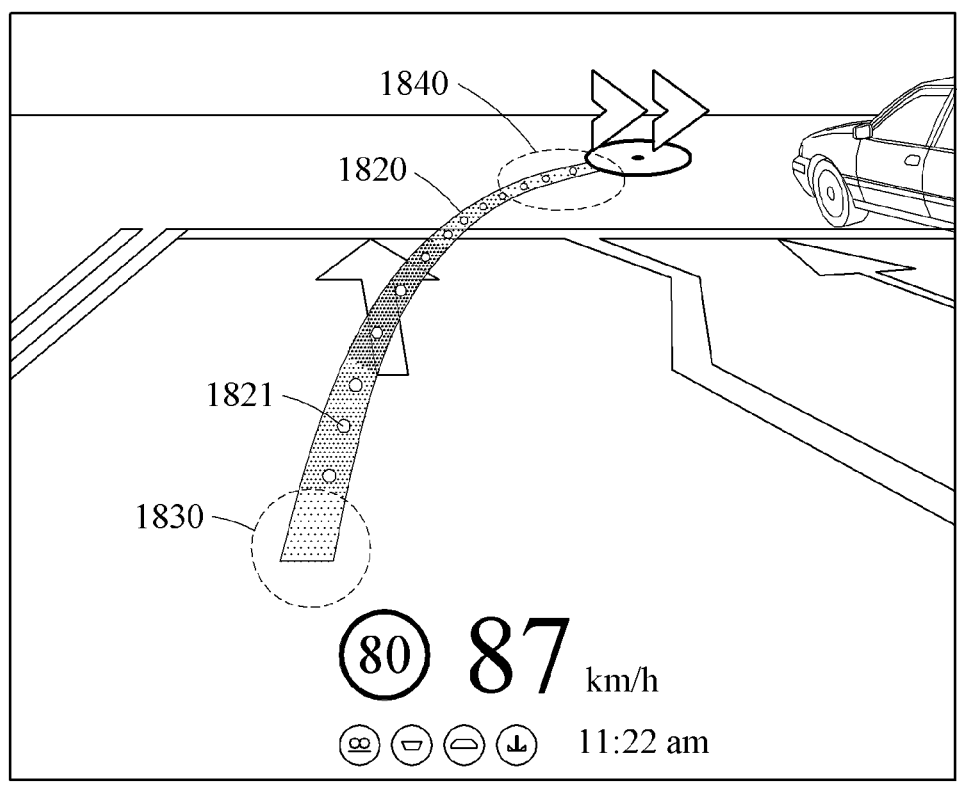
FIG. 18 illustrates an example of a graphic object corresponding to a path indicating line.

FIG. 18 illustrates an example of a graphic object corresponding to a path indicating line.

A content visualizing apparatus visualizes a path indicating line 1820 as route guidance content. As described above, the path indicating line 1820 is a line indicating a guided path along which a vehicle is to travel, and corresponds to, for example, a central line of a lane. The route guidance content includes the path indicating line 1820 including a plurality of point objects 1821 disposed along the guided path. The plurality of point objects 1821 is spaced apart from each other at unit intervals. A unit interval is, for example, 1 m. However, examples are not limited thereto. For example, the unit interval is set to 1 m with respect to a close distance, for example, a distance within 30 m from the vehicle, and the unit interval is set to 10 m with respect to a far distance, for example, a distance beyond 60 m from the vehicle. The unit interval enhances a visual perception of the user.

The content visualizing apparatus intuitively provides the user with information related to a distance to an obstacle around through the point objects 1821 disposed at equal intervals. The point objects 1821 are circles in the example of FIG. 18. However, the size and shape of the point objects 1821 may be varied without departing from the spirit and scope of the illustrative examples described.

In an example, the content visualizing apparatus determines a transparency of the graphic object based on a distance from the maximum distance of the object disposition space to the graphic object. In an example, the transparency is determined based on alpha blending. The content visualizing apparatus gradually increases a transparency of a distal end portion 1840 of the path indicating line 1820 that is farther from the content visualizing apparatus, i.e., the transparency is gradually increases in a direction away from the content visualizing apparatus. The content visualizing apparatus visualizes a portion of the path indicating line 1820 corresponding to a boundary face of the object disposition space to be completely transparent. Thus, the content visualizing apparatus visualizes the path indicating line 1820 to naturally fade out. In an example, the content visualizing apparatus gradually increases a transparency of a proximal end portion 1830 of the path indicating line 1820 that is close to the content visualizing apparatus in a direction toward the content visualizing apparatus.

Figure 19:
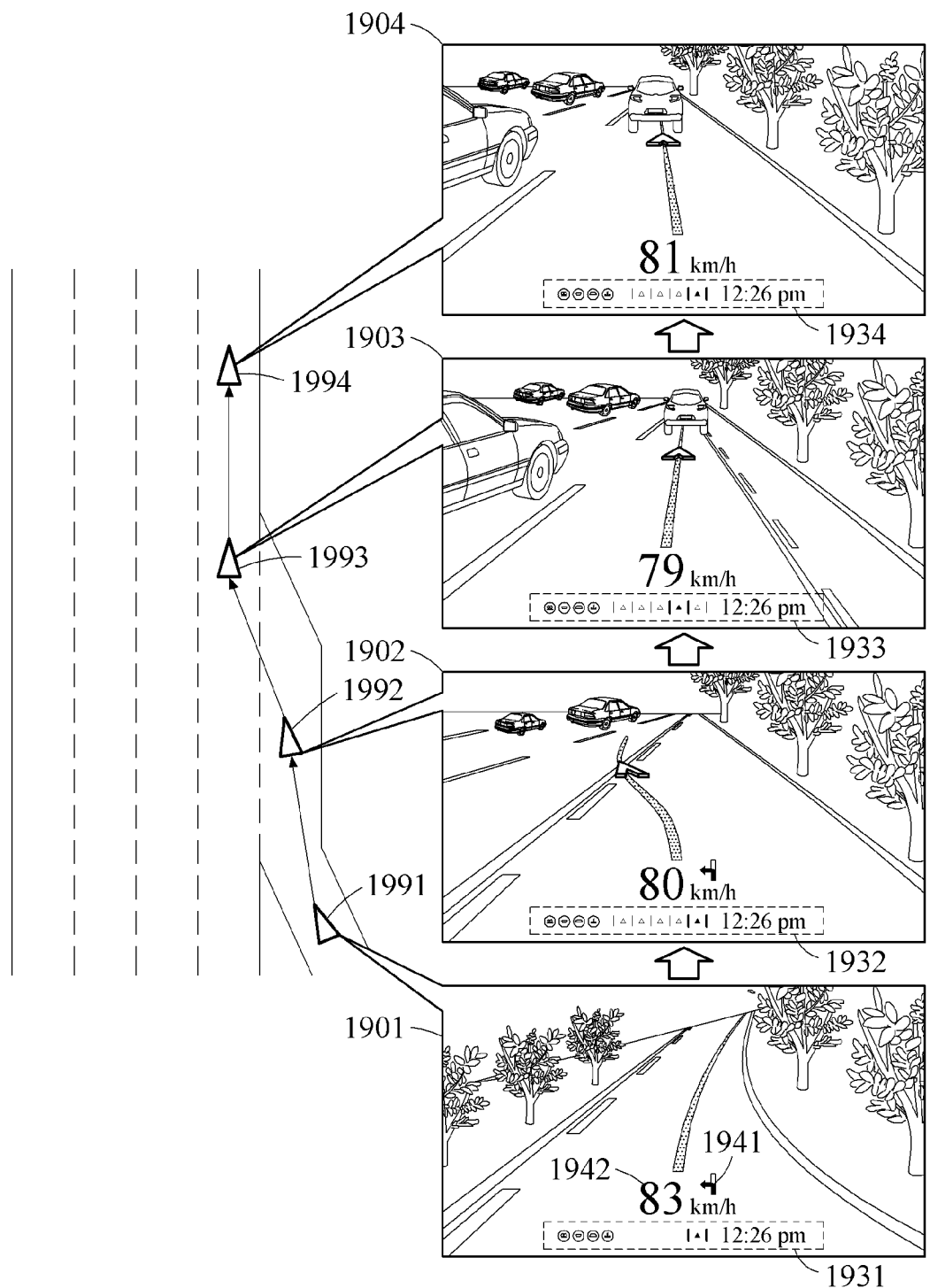
FIG. 19 illustrates an example of visualizing lane information.

FIG. 19 illustrates an example of visualizing lane information.

A content visualizing apparatus visualizes a graphic object corresponding to lane information as driving related information. As shown in FIG. 19, the content visualizing apparatus visualizes driving related content at a lower end portion of an FOV. As described above, the content visualizing apparatus visualizes the driving related content at a display position corresponding to a projection plane, thereby providing the driving related information as if a user is viewing a dashboard while driving. The driving related content is set to be provided in a size that does not interrupt driving. The content visualizing apparatus updates the driving related content in real time based on a state of a vehicle. For example, the content visualizing apparatus disposes and matches a graphic object of a 30 km speed limit sign at a position ahead similar to a gaze of a driver when a school zone appears 50 m ahead. The content visualizing apparatus visualizes content corresponding to significant information, among driving related contents, at a center of a view for a time period, and subsequently moves the content to a driving information provision region at a lower end.

The example of FIG. 19 illustrates a circumstance in which a vehicle enters a four-lane road.

A vehicle 1991 of first viewpoint travels on a highway ramp. The content visualizing apparatus provides a view image 1901 of first viewpoint with respect to the vehicle 1991 of first viewpoint. The view image 1901 illustrates a vision recognized by one of two eyes of a user, and is, for example, an image in which a real environment in front of the vehicle is overlaid with a graphic object visualized by the content visualizing apparatus. As shown in the view image 1901 of first viewpoint, the content visualizing apparatus visualizes a graphic object 1931 indicating a single lane on which the vehicle is currently travelling. In an example, the graphic object 1931 also includes the current time. In addition, the content visualizing apparatus visualizes a graphic object 1942 indicating a speed of the vehicle and a graphic object 1941 corresponding to summary content summarizing road information.

The summary content is content corresponding to a summary of the road information, and indicates, for example, a line shape, a type, the number of lanes, and properties of the road. In FIG. 19, the graphic object 1941 corresponding to the summary content indicates that the lane on which the vehicle is travelling is a lane expected to join a highway.

A vehicle 1992 of second viewpoint travels a section to join the highway. As shown in a view image 1902 of second viewpoint, the content visualizing apparatus visualizes a graphic object 1932 corresponding to the number of lanes of the road and a position of the lane on which the vehicle is currently travelling. For example, at a second viewpoint, the graphic object 1932 provides information indicating that the vehicle is travelling on a rightmost lane, from among a total of five lanes.

A vehicle 1993 of third viewpoint travels a section after joining the highway. As shown in a view image 1903 of third viewpoint, the content visualizing apparatus visualizes a graphic object 1933 associated with lane information that is updated when the vehicle changes a lane. For example, at a third viewpoint, the lane information provides information indicating that the lane on which the vehicle is currently travelling is a fourth lane, from among a total of five lanes.

A vehicle 1994 of fourth viewpoint travels a section after passing the joining section. As shown in a view image 1904 of fourth viewpoint, the content visualizing apparatus visualizes a graphic object 1934 associated with lane information that is updated when the joining lane is eliminated. For example, at a fourth viewpoint, the lane information provides information indicating that the lane on which the vehicle is currently travelling is a rightmost lane, from among a total of four lanes.

The example of FIG. 19 is provided for better understanding, and thus the lane information and the corresponding graphic objects are not limited thereto.

Figure 20:
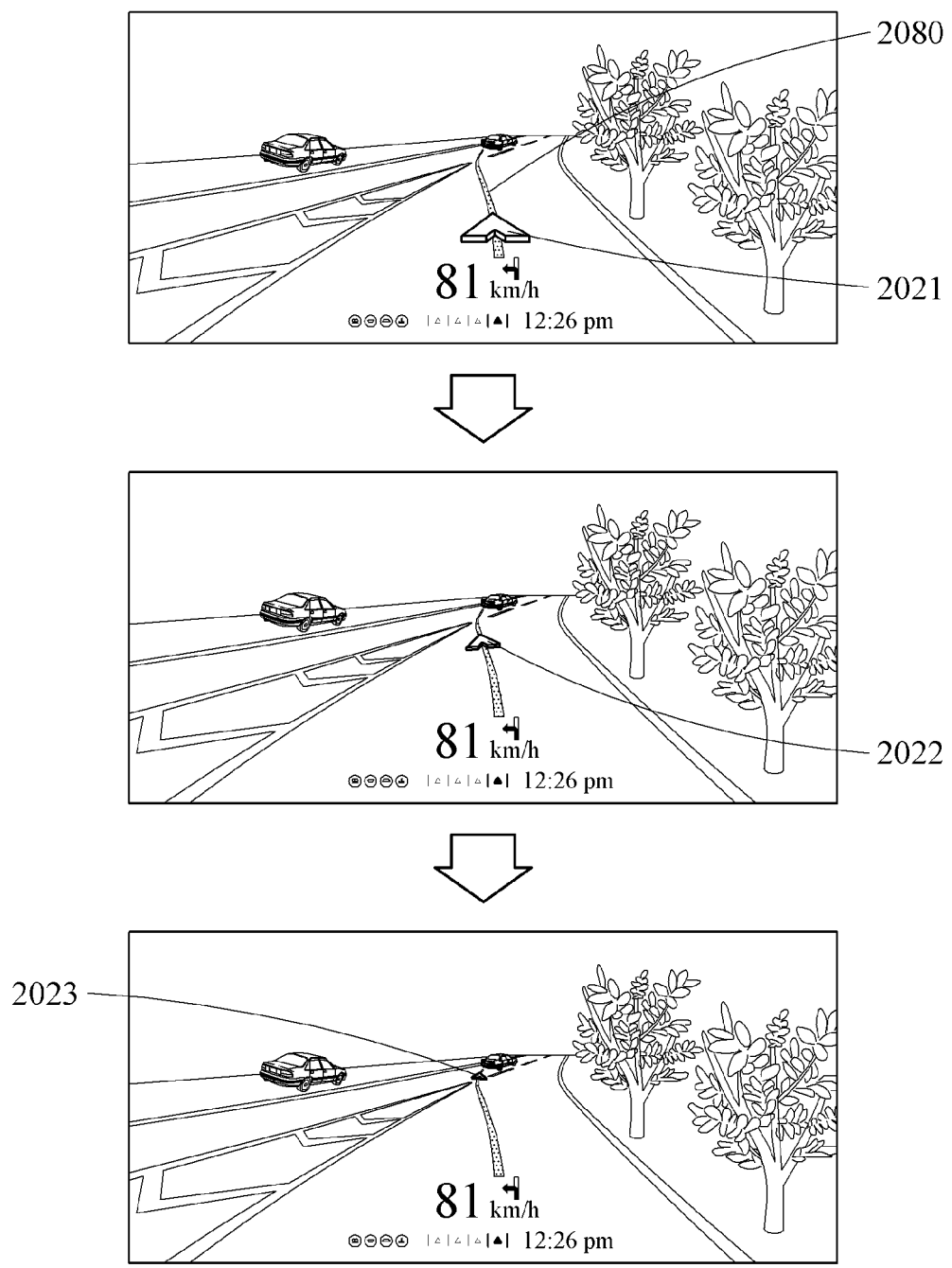
FIG. 20 illustrates an example of dynamically visualizing route guidance content.

FIG. 20 illustrates an example of dynamically visualizing route guidance content.

A content visualizing apparatus dynamically visualizes a graphic object of route guidance content corresponding to a dynamic event, in response to detection of the dynamic event.

For example, the content visualizing apparatus moves the graphic object being visualized by continuously changing a display point from a position of a vehicle to an indication point for each frame. The content visualizing apparatus moves the graphic object along a path indicating line 2080. Thus, the graphic object quickly moves forward along the path indicating line 2080 in a view of a user, and the content visualizing apparatus induces an action of the user corresponding to the dynamic event.

In the example of FIG. 20, the dynamic event is a lane change event. In the example of FIG. 20, route guidance information includes a guidance indicating the user needs to join a left lane, and the path indicating line 2080 is formed from a current lane to the left lane to which a lane change is to be made. At a first viewpoint, the content visualizing apparatus generates first route guidance content 2021 and visualizes the first route guidance content 2021 at a display position corresponding to the path indicating line 2080. At a second viewpoint, the content visualizing apparatus moves the display position forward along the path indicating line 2080, and visualizes second route guidance content 2022 at a new display position. At a third viewpoint, the content visualizing apparatus determines a position further ahead of the second route guidance content 2022 to be the display position, and visualizes third route guidance content 2023 at the corresponding display position. When the display position for the route guidance content is moved forward along the path indicating line 2080 and reaches a boundary face of an object disposition space, the content visualizing apparatus eliminates the existing display position and determines a new display position. For example, the content visualizing apparatus generates a new graphic object corresponding to route guidance content using a position of the content visualizing apparatus as a start point, and moves the graphic object to an indication point, for example, an end point corresponding to the boundary face of the object disposition space.

FIG. 21 illustrates an example of statically visualizing route guidance content.

When a static event is detected, a content visualizing apparatus statically visualizes a graphic object of route guidance content corresponding to the static event.

The content visualizing apparatus visualizes the graphic object by fixing a display position to an indication point. The content visualizing apparatus visualizes the graphic object at the fixed display position until the content visualizing apparatus passes by the display position. A user recognizes as if the content visualizing apparatus approaches a position at which the graphic object is disposed.

In the example of FIG. 21, the static event is a lane keeping event. In the example of FIG. 21, route guidance information includes a guidance indicating the user needs to keep driving on a current lane, and a path indicating line is formed along a central line of the current lane. At a first viewpoint 2101, the content visualizing apparatus visualizes route guidance content 2121 for straight advance at an indication point. At a second viewpoint 2102, the content visualizing apparatus visualizes the route guidance content 2121 at the indication point even when a distance between the content visualizing apparatus and the indication point decrease.

Figure 22:
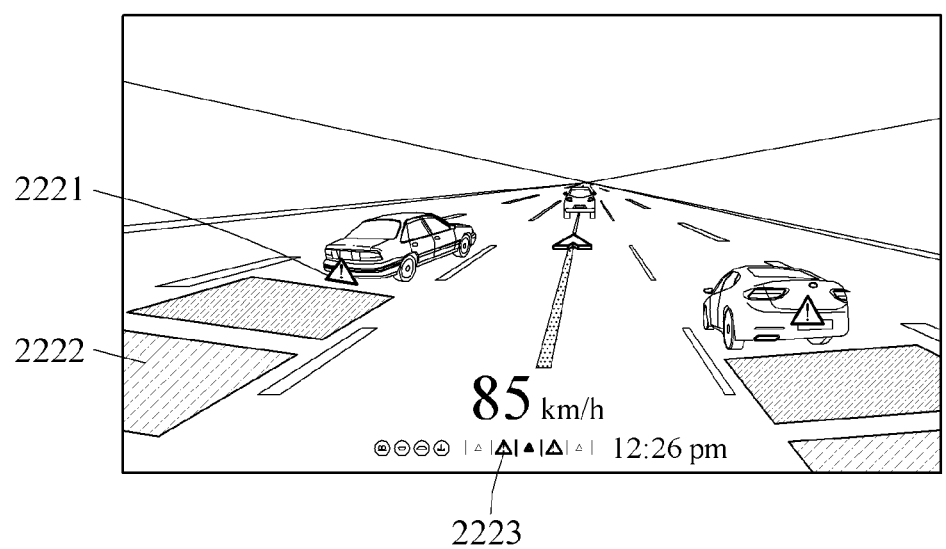
FIG. 22 illustrates an example of warning of a dangerous object.

FIG. 22 illustrates an example of warning of a dangerous object.

A content visualizing apparatus visualizes a graphic object corresponding to information related to a lane on which the content visualizing apparatus is travelling, and a graphic object corresponding to a dangerous object in a vicinity of the content visualizing apparatus, on a road on which the content visualizing apparatus is positioned.

The content visualizing apparatus detects whether a dangerous object exists within a dangerous distance. When a dangerous object exists within the distance, the content visualizing apparatus determines a display position based on physical coordinates of the dangerous object. For example, the content visualizing apparatus determines a point corresponding to a rear face of a bounding box detected with respect to the dangerous object to be the display position. The content visualizing apparatus visualizes a first dangerous graphic object 2221 on a rear face of the dangerous object. Further, the content visualizing apparatus visualizes a dangerous region 2222 indicating a potential danger on a rear side of the dangerous object. The dangerous region 2222 is fit to a bottom face of the object disposition space. Furthermore, the content visualizing apparatus visualizes a graphic object 2223 corresponding to information related to a lane on which the dangerous object exists.

Figure 23:
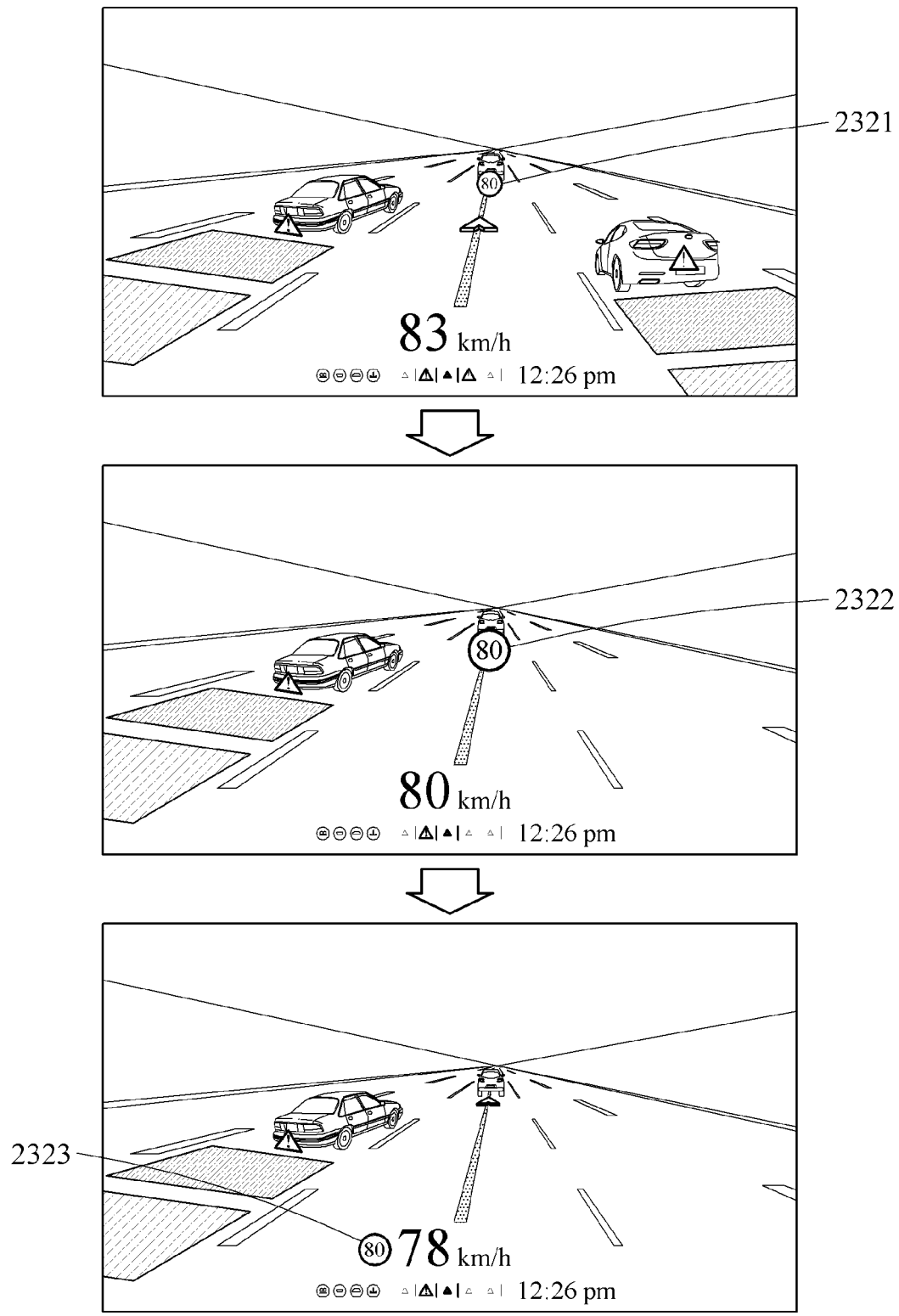
FIG. 23 illustrates an example of providing speed limit information.

FIG. 23 illustrates an example of providing speed limit information.

When a driving related event is detected, a content visualizing apparatus visualizes a graphic object corresponding to the detected event. In an example, when a section is designated for the driving related event, the content visualizing apparatus determines a start point of the section to be a display position and fixes the display position. In an example, the content visualizing apparatus visualizes the graphic object corresponding to the driving related event at the fixed display position. In an example, when the content visualizing apparatus crosses the start point of the section, the content visualizing apparatus adds a graphic object corresponding to driving related content corresponding to the driving related event to a corner of an object disposition space.

In response to detection of an event to enter a speed limit zone, the content visualizing apparatus visualizes a graphic object of driving related content corresponding to the speed limit zone. In the example of FIG. 23, the content visualizing apparatus determines a start point of the speed limit zone to be the display position. The content visualizing apparatus visualizes speed limit content 2321 at the start point of the speed limit zone. The content visualizing apparatus fixes a position of the speed limit content 2321. Thus, as a vehicle travels, the content visualizing apparatus provides speed limit content 2322 that is visualized to be enlarged. In an example, the content visualizing apparatus visualizes speed limit content 2323 in a driving information provision region, for example, a lower end region in the object disposition space, after the content visualizing apparatus enters the speed limit zone.

However, the driving related event is not limited to the speed limit event. Various events, such as, for example, entering a work zone, may be set depending on a design.

Figure 24:
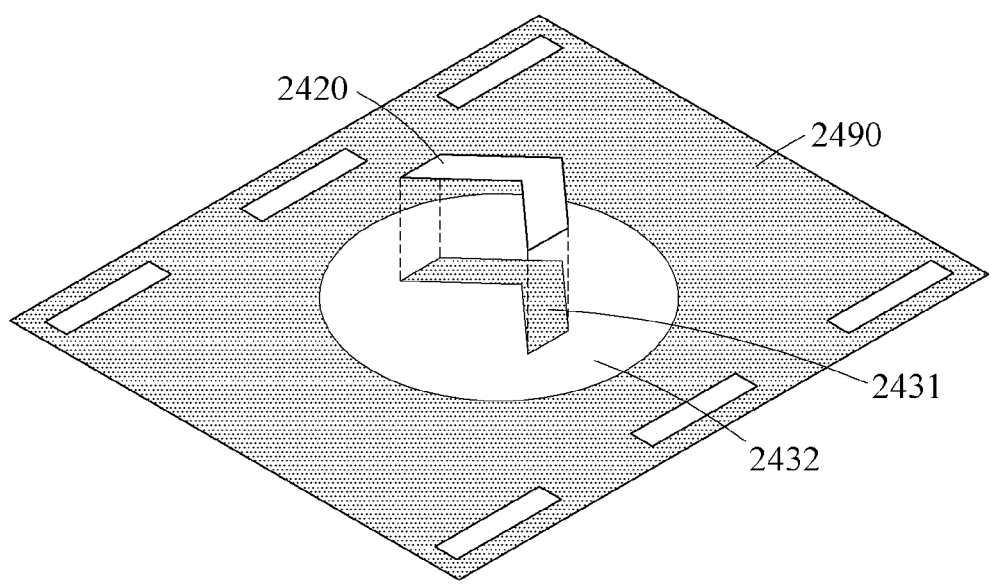
FIG. 24 illustrates an example of visualizing a shadow object corresponding to route guidance content.

FIG. 24 illustrates an example of visualizing a shadow object corresponding to route guidance content.

A content visualizing apparatus visualizes a shadow object in a region below a graphic object 2420 in an object disposition space. The content visualizing apparatus maintains a brightness of a shadow region 2431 below the graphic object 2420. The content visualizing apparatus visualizes the object with a higher brightness than the shadow region 2431 with respect to a region 2432 around the shadow region 2431. The region 2432 is a region at least enclosing the shadow region 2431. The region 2432 is in a circular shape. However, examples are not limited thereto.

A transparent HUD has difficulties in lowering the brightness of the graphic object 2420, and thus, has restrictions in shadow representation. The content visualizing apparatus increases the brightness of the region 2432, rather than the shadow region 2431 to represent a shadow, thereby implementing a shadow through an optical illusion that the brightness of the shadow region 2431 appears relatively lower. A road surface 2490 is generally of a relatively dark color, and thus a shadow is represented realistically. A shadow of the 3D object that is represented in a stereoscopic space provides a user with a more realistic feeling.

The content visualizing apparatuses 200 and 310, and other apparatuses, units, modules, devices, and other components described herein with respect to FIGS. 1-24 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-24 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of visualizing content. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A content visualizing method, comprising:
generating a three-dimensional (3D) object disposition space based on a road region ahead;
determining a display position for route guidance content based on an indication point of the route guidance content and the 3D object disposition space; and
three-dimensionally visualizing a graphic object corresponding to the route guidance content at the determined display position,
wherein the generating comprises generating the 3D object disposition space based on a field of view (FOV) of a user and a distance from a viewpoint of the user to an obstacle.

2. The content visualizing method of claim 1, wherein the indication point comprises a point where an operation corresponding to the route guidance content is performed.

3. The content visualizing method of claim 1, wherein the three-dimensionally visualizing comprises:
generating a first graphic representation corresponding to a left eye of a user and a second graphic representation corresponding to a right eye of the user; and
providing a disparity between the first graphic representation and the second graphic representation.

4. The content visualizing method of claim 3, wherein the providing comprises tracking positions of the left eye and the right eye of the user.

5. The content visualizing method of claim 1, wherein the determining comprises determining a position in the 3D object disposition space to be the display position, in response to the indication point being out of the 3D object disposition space.

6. The content visualizing method of claim 1, wherein a position corresponding to the indication point is located substantially close to a limiting plane of the object disposition space, and on an axis from a center of an eye box of the user toward the point.

7. The content visualizing method of claim 1, wherein the determining comprises fitting a height of the display position to a bottom of the 3D object disposition space, in response to a height of the indication point being lower than the bottom of the 3D object disposition space.

8. The content visualizing method of claim 1, wherein the determining comprises fitting a height of the display position to a bottom of the 3D object disposition space, in response to a road surface not intersecting a space corresponding to a view of a user.

9. The content visualizing method of claim 1, wherein the determining comprises updating the display position to be within the 3D object disposition space, in response to a distance from a user to the display position being greater than a maximum distance of the 3D object disposition space.

10. The content visualizing method of claim 1, wherein the three-dimensionally visualizing comprises:
   determining a content movement trajectory based on a field of view (FOV) of a user and a body of a vehicle; and
   visualizing the graphic object by adjusting a height of the graphic object based on the content movement trajectory, in response to a content visualizing apparatus approaching the indication point.

11. The content visualizing method of claim 1, further comprising:
   restricting the 3D object disposition space, in response to the 3D object disposition space intersecting a road surface.

12. The content visualizing method of claim 1, wherein a bottom of the 3D object disposition space is fitted to a surface of a road region estimated in a vicinity of a vehicle.

13. The content visualizing method of claim 12, wherein the generating of the 3D object disposition space comprises fitting the bottom of the 3D object disposition space to the road surface to a maximum distance from an intersections of the road surface and a space corresponding to a field of view (FOV) of a user.

14. The content visualizing method of claim 1, further comprising:
   determining a subsequent display position for subsequent route guidance content, in response to a content visualizing apparatus reaching the display point for the route guidance content; and
   visualizing another graphic object corresponding to the subsequent route guidance content at the subsequent display position.

15. The content visualizing method of claim 1, wherein the three-dimensionally visualizing comprises determining a transparency of the graphic object based on a distance from a maximum distance of the 3D object disposition space to the graphic object.

16. The content visualizing method of claim 1, further comprising increasing a transparency of the route guidance content that is located proximal to a boundary of the 3D object disposition space.

17. The content visualizing method of claim 1, wherein the determining comprises obtaining temporary guidance content corresponding to the display position, in response to the indication point differing from the display position,
   wherein the three-dimensionally visualizing comprises visualizing a graphic object corresponding to the temporary guidance content at the display position until the 3D object disposition space includes the indication point.

18. The content visualizing method of claim 1, further comprising:
   visualizing a graphic object corresponding to information related to a lane on which a content visualizing apparatus is travelling, and a graphic object corresponding to a dangerous object on a road on which the content visualizing apparatus is positioned.

19. A non-transitory computer-readable storage medium storing instructions that, when executed by a processor, cause the processor to perform the content visualizing method of claim 1.

20. The content visualizing method of claim 1, wherein the generating comprises generating the 3D object disposition space based on a field of view (FOV) of a user and a body of a vehicle on which a content visualizing apparatus is mounted.

21. The content visualizing method of claim 1, wherein the three-dimensionally visualizing comprises visualizing a shadow object in a region under the graphic object in the 3D object disposition space.

22. The content visualizing method of claim 21, wherein the visualizing of the shadow object comprises:
   maintaining a brightness of a shadow region under the graphic object with respect to a region around the shadow region; and
   visualizing the graphic object at a brightness higher than that of the shadow region.

23. The content visualizing method of claim 1, wherein the route guidance content comprises a plurality of point objects disposed along a line,
   wherein the plurality of point objects are spaced apart from each other at a unit interval.

24. The content visualizing method of claim 1, wherein the three-dimensionally visualizing comprises visualizing the graphic object while gradually moving the graphic object from a previous display position to a new display position, in response to the display position being changed while the graphic object is visualized.

25. A content visualizing method, comprising:
   generating a three-dimensional (3D) object disposition space based on a road region ahead;
   determining a display position for route guidance content based on an indication point of the route guidance content and the 3D object disposition space; and
   three-dimensionally visualizing a graphic object corresponding to the route guidance content at the determined display position,
   wherein the generating comprises generating the 3D object disposition space based on a field of view (FOV) of a user and a body of a vehicle on which a content visualizing apparatus is mounted.

26. A content visualizing method, comprising:
   generating a three-dimensional (3D) object disposition space based on a road region ahead;
   determining a display position for route guidance content based on an indication point of the route guidance content and the 3D object disposition space; and
   three-dimensionally visualizing a graphic object corresponding to the route guidance content at the determined display position,
   wherein the three-dimensionally visualizing comprises visualizing a shadow object in a region under the graphic object in the 3D object disposition space.

27. The content visualizing method of claim 26, wherein the visualizing of the shadow object comprises:
   maintaining a brightness of a shadow region under the graphic object with respect to a region around the shadow region; and
   visualizing the graphic object at a brightness higher than that of the shadow region.

28. A content visualizing method, comprising:
generating a three-dimensional (3D) object disposition space based on a road region ahead;
determining a display position for route guidance content based on an indication point of the route guidance content and the 3D object disposition space; and
three-dimensionally visualizing a graphic object corresponding to the route guidance content at the determined display position, wherein the route guidance content comprises a plurality of point objects disposed along a line,
wherein the plurality of point objects are spaced apart from each other at a unit interval.

29. A content visualizing method, comprising:
generating a three-dimensional (3D) object disposition space based on a road region ahead;
determining a display position for route guidance content based on an indication point of the route guidance content and the 3D object disposition space; and
three-dimensionally visualizing a graphic object corresponding to the route guidance content at the determined display position,
wherein the three-dimensionally visualizing comprises visualizing the graphic object while gradually moving the graphic object from a previous display position to a new display position, in response to the display position being changed while the graphic object is visualized.

30. A content visualizing apparatus, comprising:
a processor configured to generate a three-dimensional (3D) object disposition space based on a road region ahead, and to determine a display position based on an indication point of route guidance content and the 3D object disposition space; and
a display configured to three-dimensionally visualize a graphic object corresponding to the route guidance content at the determined display position,
wherein, for the generating, the processor is further configured to generate the 3D object disposition space based on a field of view (FOV) of a user and a distance from a viewpoint of the user to an obstacle.

31. The content visualizing apparatus of claim 30, further comprising a memory configured to store the route guidance content, the information related to the state of a device, map database, and instructions that, when executed, configures the processor to determine any one or any combination of the 3D object disposition space and the display position.

32. The content visualizing method of claim 30, wherein the processor is further configured to determine the indication point based on road information in the map database.

33. The content visualizing apparatus of claim 32, further comprising a sensor, disposed on a device, and being configured to sense information related to a state of the device, and a distance from an obstacle in a vicinity of the device, and to track positions of a left eye and a right eye of a user, in response to the vehicle being in motion; and
the processor is further configured to
generate a first graphic representation corresponding to the position of the left eye of the user,
generate a second graphic representation corresponding to the position of the right eye of the user, and
render the 3D graphic object on the HUD based on a disparity between the first graphic representation and the second graphic representation.

34. The content visualizing apparatus of claim 33, wherein the device comprises a vehicle, and the information related to the state of the device comprises any one or any combination of position information of the vehicle, current geographical coordinates of the vehicle, road information corresponding to a position of the vehicle, lane on which the vehicle is travelling, width of the lane on which the vehicle is travelling, width of a road on which the vehicle is travelling, a number of lanes of the road, a center line of the lane, turn points on the road, traffic signals on the road, a speed of the vehicle, fuel of the vehicle, fuel level of the vehicle, and maintenance information of the vehicle.

35. The content visualizing apparatus of claim 30, wherein the object disposition space comprises a rectangular cone-shaped area extending from both eyes of a user to a road region in front of the device.

36. The content visualizing apparatus of claim 30, further comprising a memory configured to store the route guidance content, the information related to the state of a device, map database, and instructions that, when executed, configures the processor to determine any one or any combination of the 3D object disposition space and the display position.

* * * * *